(12) United States Patent
Tarr et al.

(10) Patent No.: US 7,800,609 B2
(45) Date of Patent: Sep. 21, 2010

(54) METHOD AND APPARATUS FOR GENERATING AND INTERFACING WITH A HAPTIC VIRTUAL REALITY ENVIRONMENT

(75) Inventors: Christopher Tarr, Somerville, MA (US); J. Kenneth Salisbury, Jr., Windham, MA (US); Thomas Harold Massie, Windham, NH (US); Walter A. Aviles, San Diego, CA (US)

(73) Assignee: SensAble Technologies, Inc., Woburn, MA (US)

( * ) Notice: Subject to any disclaimer, the term of this patent is extended or adjusted under 35 U.S.C. 154(b) by 0 days.

(21) Appl. No.: 11/968,474

(22) Filed: Jan. 2, 2008

(65) Prior Publication Data

US 2008/0218514 A1    Sep. 11, 2008

Related U.S. Application Data

(63) Continuation of application No. 09/574,131, filed on May 18, 2000, now Pat. No. 7,319,466, which is a continuation of application No. 08/691,247, filed on Aug. 2, 1996, now Pat. No. 6,084,587.

(51) Int. Cl.
*G06T 15/00* (2006.01)
*G06F 3/01* (2006.01)

(52) U.S. Cl. .................. 345/419; 345/420; 715/701; 715/702

(58) Field of Classification Search ............. 345/420, 345/419; 715/701, 702
See application file for complete search history.

(56) References Cited

U.S. PATENT DOCUMENTS

| | | | |
|---|---|---|---|
| 2,475,484 A | 7/1949 | DeNise | |
| 3,168,203 A | 2/1965 | Gallistel | |
| 3,263,824 A | 8/1966 | Jones et al. | |
| 3,449,008 A | 6/1969 | Colechia | |

(Continued)

FOREIGN PATENT DOCUMENTS

EP    0364947 B1    4/1990

(Continued)

OTHER PUBLICATIONS

"3-D Animation Workshop," printed Jul. 29, 2003, http://webreference.com/3d/, Lessons 39, 64-68, and 72; 79 pgs.

(Continued)

*Primary Examiner*—M Good Johnson
(74) *Attorney, Agent, or Firm*—Goodwin Procter LLP

(57) ABSTRACT

A method for generating a haptic interactive representation including the steps of defining a haptic interaction space and building a hierarchical construct, for use within the haptic interaction space, using a plurality of underlying constructs. In one embodiment the method includes determining the forces to be applied to a user by generating a haptic interactive, sensing a position of a user in real space, determining a haptic interface location in the haptic interaction space in response to the position of the user in real space and determining whether the virtual object collides with the haptic interface location. The invention also relates to a method for interacting with a haptic interactive representation. The method includes creating a haptic process having the haptic interactive representation, associating a callback with the haptic process, connecting to a second process which interacts with the haptic process and associating the callback which is associated with the haptic process with the second process. The method further includes requesting the callback by the second process, and returning, by the haptic process through the callback to the second process, at least one parameter associated with the haptic interactive representation.

4 Claims, 21 Drawing Sheets

U.S. PATENT DOCUMENTS

| | | |
|---|---|---|
| 3,531,868 A | 10/1970 | Stevenson |
| 3,618,786 A | 11/1971 | Fick |
| 3,637,092 A | 1/1972 | George et al. |
| 3,846,826 A | 11/1974 | Mueller |
| 3,920,972 A | 11/1975 | Corwin, Jr. et al. |
| 3,944,798 A | 3/1976 | Eaton |
| 4,062,455 A | 12/1977 | Flatau |
| 4,150,803 A | 4/1979 | Fernandez |
| 4,216,467 A | 8/1980 | Colston |
| 4,302,138 A | 11/1981 | Zarudiansky et al. |
| 4,367,532 A | 1/1983 | Crum et al. |
| 4,420,808 A | 12/1983 | Diamond et al. |
| 4,510,574 A | 4/1985 | Guittet et al. |
| 4,521,685 A | 6/1985 | Rebman |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano et al. |
| 4,654,648 A | 3/1987 | Herrington et al. |
| 4,655,673 A | 4/1987 | Hawkes |
| 4,661,032 A | 4/1987 | Arai et al. |
| 4,670,851 A | 6/1987 | Murakami et al. |
| 4,676,002 A | 6/1987 | Slocum |
| 4,680,519 A | 7/1987 | Chand et al. |
| 4,686,522 A | 8/1987 | Hernandez et al. |
| 4,703,443 A | 10/1987 | Moriyasu et al. |
| 4,729,098 A | 3/1988 | Cline et al. |
| 4,769,763 A | 9/1988 | Trieb et al. |
| 4,791,934 A | 12/1988 | Brunnett |
| 4,795,296 A | 1/1989 | Jau |
| 4,800,721 A | 1/1989 | Cemenska et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,853,874 A | 8/1989 | Iwamoto et al. |
| 4,868,761 A | 9/1989 | Hayashi |
| 4,868,766 A | 9/1989 | Oosterholt |
| 4,888,538 A | 12/1989 | Dimitrov et al. |
| 4,893,981 A | 1/1990 | Yoshinada et al. |
| 4,901,253 A | 2/1990 | Iwano et al. |
| 4,907,970 A | 3/1990 | Meenen, Jr. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A | 11/1990 | Haacke et al. |
| 4,973,215 A | 11/1990 | Karlen et al. |
| 4,982,504 A | 1/1991 | Soderberg et al. |
| 4,988,981 A | 1/1991 | Zimmerman et al. |
| 5,004,391 A | 4/1991 | Burdea |
| 5,007,300 A | 4/1991 | Siva et al. |
| 5,018,922 A | 5/1991 | Yoshinada et al. |
| 5,019,761 A | 5/1991 | Kraft |
| 5,027,292 A | 6/1991 | Rossignac et al. |
| 5,038,089 A | 8/1991 | Szakaly |
| 5,040,306 A | 8/1991 | McMurtry et al. |
| 5,044,956 A | 9/1991 | Behensky et al. |
| 5,053,975 A | 10/1991 | Tsuchihashi et al. |
| 5,072,361 A | 12/1991 | Davis et al. |
| 5,088,046 A | 2/1992 | McMurtry et al. |
| 5,088,055 A | 2/1992 | Oyama et al. |
| 5,103,404 A | 4/1992 | McIntosh |
| 5,105,367 A | 4/1992 | Tsuchihashi et al. |
| 5,116,051 A | 5/1992 | Moncrief et al. |
| 5,116,180 A | 5/1992 | Fung et al. |
| 5,130,632 A | 7/1992 | Ezawa et al. |
| 5,131,844 A | 7/1992 | Marinaccio et al. |
| 5,142,931 A | 9/1992 | Menahem |
| 5,143,505 A | 9/1992 | Burdea et al. |
| 5,184,319 A | 2/1993 | Kramer |
| 5,185,561 A | 2/1993 | Good et al. |
| 5,189,806 A | 3/1993 | McMurtry et al. |
| 5,193,963 A | 3/1993 | McAffee et al. |
| 5,204,824 A | 4/1993 | Fujimaki et al. |
| 5,220,260 A | 6/1993 | Schuler |
| 5,223,776 A | 6/1993 | Radke et al. |
| 5,237,647 A | 8/1993 | Roberts et al. |
| 5,239,246 A | 8/1993 | Kim |
| 5,255,211 A | 10/1993 | Redmond |
| 5,264,768 A | 11/1993 | Gregory et al. |
| 5,265,197 A | 11/1993 | Kondo |
| 5,266,875 A | 11/1993 | Slotine et al. |
| 5,273,038 A | 12/1993 | Beavin |
| 5,304,884 A | 4/1994 | Kitajima et al. |
| 5,321,622 A | 6/1994 | Snead et al. |
| 5,333,257 A | 7/1994 | Merrill et al. |
| 5,354,162 A | 10/1994 | Burdea et al. |
| 5,382,885 A | 1/1995 | Salcudean et al. |
| 5,388,199 A | 2/1995 | Kakazu et al. |
| 5,389,685 A | 2/1995 | Smith et al. |
| 5,396,265 A | 3/1995 | Ulrich et al. |
| 5,414,337 A | 5/1995 | Schuler |
| 5,428,715 A | 6/1995 | Suzuki |
| 5,429,140 A | 7/1995 | Burdea et al. |
| 5,438,529 A | 8/1995 | Rosenberg et al. |
| 5,446,834 A | 8/1995 | Deering |
| 5,455,902 A | 10/1995 | Ellson et al. |
| 5,459,382 A | 10/1995 | Jacobus et al. |
| 5,479,593 A | 12/1995 | Brewer et al. |
| 5,481,470 A | 1/1996 | Snead et al. |
| 5,482,051 A | 1/1996 | Reddy et al. |
| 5,487,012 A | 1/1996 | Topholm et al. |
| 5,489,830 A | 2/1996 | Fernandez |
| 5,497,452 A | 3/1996 | Shimizu et al. |
| 5,506,785 A | 4/1996 | Blank et al. |
| 5,515,078 A | 5/1996 | Greschler et al. |
| 5,555,894 A | 9/1996 | Doyama et al. |
| 5,559,412 A | 9/1996 | Schuler |
| 5,561,747 A | 10/1996 | Crocker et al. |
| 5,561,748 A | 10/1996 | Niu et al. |
| 5,576,727 A | 11/1996 | Rosenberg et al. |
| 5,587,937 A | 12/1996 | Massie et al. |
| 5,589,854 A | 12/1996 | Tsai et al. |
| D377,932 S | 2/1997 | Schena et al. |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,633,951 A | 5/1997 | Moshfeghi |
| 5,642,469 A | 6/1997 | Hannaford et al. |
| 5,649,076 A | 7/1997 | Nishizaka et al. |
| 5,659,493 A | 8/1997 | Kiridena et al. |
| 5,666,138 A | 9/1997 | Culver |
| 5,691,898 A | 11/1997 | Rosenberg et al. |
| 5,694,013 A | 12/1997 | Stewart et al. |
| 5,701,140 A | 12/1997 | Rosenberg et al. |
| 5,704,791 A | 1/1998 | Gillio |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,742,278 A | 4/1998 | Chen et al. |
| 5,751,289 A | 5/1998 | Myers |
| 5,754,023 A | 5/1998 | Roston et al. |
| 5,766,016 A | 6/1998 | Sinclair et al. |
| 5,767,839 A | 6/1998 | Rosenberg |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |

| | | |
|---|---|---|
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |
| 5,808,616 A | 9/1998 | Shimizu |
| 5,815,154 A | 9/1998 | Hirschtick et al. |
| 5,821,920 A | 10/1998 | Rosenberg et al. |
| 5,825,308 A | 10/1998 | Rosenberg |
| 5,828,197 A | 10/1998 | Martin et al. |
| 5,831,408 A | 11/1998 | Jacobus et al. |
| 5,844,392 A | 12/1998 | Peurach et al. |
| 5,847,956 A | 12/1998 | Bronfeld et al. |
| 5,859,934 A | 1/1999 | Green |
| 5,872,438 A | 2/1999 | Roston |
| 5,873,106 A | 2/1999 | Joseph |
| 5,880,714 A | 3/1999 | Rosenberg et al. |
| 5,881,178 A | 3/1999 | Tsykalov et al. |
| 5,889,670 A | 3/1999 | Schuler et al. |
| 5,898,599 A | 4/1999 | Massie et al. |
| 5,903,270 A | 5/1999 | Gentry et al. |
| 5,903,886 A | 5/1999 | Heimlich et al. |
| 5,907,487 A | 5/1999 | Rosenberg et al. |
| 5,913,727 A | 6/1999 | Ahdoot |
| 5,929,607 A | 7/1999 | Rosenberg et al. |
| 5,929,846 A | 7/1999 | Rosenberg et al. |
| 5,956,484 A | 9/1999 | Rosenberg et al. |
| 5,963,212 A | 10/1999 | Bakalash et al. |
| 5,973,678 A | 10/1999 | Stewart et al. |
| 5,988,862 A | 11/1999 | Kacyra et al. |
| 5,999,187 A | 12/1999 | Dehmlow et al. |
| 6,040,840 A | 3/2000 | Koshiba et al. |
| 6,046,726 A | 4/2000 | Keyson |
| 6,061,004 A | 5/2000 | Rosenberg |
| 6,064,394 A | 5/2000 | Morrison |
| 6,084,587 A | 7/2000 | Tarr et al. |
| 6,111,577 A | 8/2000 | Zilles et al. |
| 6,115,046 A | 9/2000 | Chen et al. |
| 6,120,171 A | 9/2000 | Shaikh |
| 6,131,097 A | 10/2000 | Peurach et al. |
| 6,191,796 B1 | 2/2001 | Tarr |
| 6,211,848 B1 | 4/2001 | Plesniak et al. |
| 6,219,032 B1 | 4/2001 | Rosenberg et al. |
| 6,226,003 B1 | 5/2001 | Akeley |
| 6,308,144 B1 | 10/2001 | Bronfeld et al. |
| 6,337,678 B1 | 1/2002 | Fish |
| 6,342,880 B2 | 1/2002 | Rosenberg et al. |
| 6,369,834 B1 | 4/2002 | Zilles et al. |
| 6,384,822 B1 | 5/2002 | Bilodeau et al. |
| 6,417,638 B1 | 7/2002 | Guy et al. |
| 6,421,048 B1 | 7/2002 | Shih et al. |
| 6,448,977 B1 | 9/2002 | Braun et al. |
| 6,552,722 B1 | 4/2003 | Shih et al. |
| 6,570,564 B1 | 5/2003 | Sowizral et al. |
| 6,608,631 B1 | 8/2003 | Milliron |
| 6,628,280 B2 | 9/2003 | Perry et al. |
| 6,671,651 B2 | 12/2003 | Goodwin et al. |
| 6,703,550 B2 | 3/2004 | Chu |
| 6,704,694 B1 | 3/2004 | Basdogan et al. |
| 6,707,458 B1 | 3/2004 | Leather et al. |
| 6,773,408 B1 | 8/2004 | Acker et al. |
| 6,792,398 B1 | 9/2004 | Handley et al. |
| 6,803,928 B2 | 10/2004 | Bimber et al. |
| 6,809,738 B2 | 10/2004 | Hubrecht et al. |
| 6,822,635 B2 | 11/2004 | Shahoian et al. |
| 7,050,955 B1 | 5/2006 | Carmel et al. |
| 7,208,671 B2 | 4/2007 | Chu |
| 7,432,910 B2 | 10/2008 | Shahoian |
| 2002/0075283 A1 | 6/2002 | Payne |
| 2002/0089500 A1 | 7/2002 | Jennings et al. |
| 2002/0130820 A1 | 9/2002 | Sullivan |
| 2002/0154132 A1 | 10/2002 | Dumesny et al. |
| 2002/0158842 A1 | 10/2002 | Guy et al. |
| 2003/0117411 A1 | 6/2003 | Fujiwara et al. |
| 2003/0128208 A1 | 7/2003 | Shih et al. |
| 2003/0191554 A1 | 10/2003 | Russell et al. |
| 2005/0060130 A1 | 3/2005 | Shapiro et al. |
| 2005/0062738 A1 | 3/2005 | Handley et al. |
| 2005/0168460 A1 | 8/2005 | Razdan et al. |
| 2006/0202953 A1 | 9/2006 | Pryor et al. |

FOREIGN PATENT DOCUMENTS

| | | |
|---|---|---|
| EP | 0518648 B1 | 12/1992 |
| EP | 0915434 | 5/1999 |
| GB | 2389764 | 12/2003 |
| GB | 2410351 | 7/2005 |
| JP | 63-149416 A | 6/1988 |
| JP | 63-177497 A | 7/1988 |
| WO | WO-95/02801 | 1/1995 |
| WO | WO-96/16397 | 5/1996 |
| WO | WO-96/22591 | 7/1996 |
| WO | WO-96/42078 | 12/1996 |
| WO | WO-97/06410 | 2/1997 |
| WO | WO-97/12337 | 4/1997 |
| WO | WO-97/12357 | 4/1997 |
| WO | WO-97/19440 | 5/1997 |
| WO | WO-97/21160 | 6/1997 |
| WO | WO-97/44775 | 11/1997 |
| WO | WO-98/06024 | 2/1998 |
| WO | WO-98/26342 | 6/1998 |
| WO | WO-98/30951 | 7/1998 |
| WO | WO-98/58308 | 12/1998 |
| WO | WO-98/58323 | 12/1998 |
| WO | WO-99/10872 | 3/1999 |

OTHER PUBLICATIONS

"CAD Basics 2: Geometric Primitives," <http://caad.arch.ethz.ch/teaching/nds/ws98/computing/cad/cad2.html>, printed Jul. 28, 2003.

"Computer Graphics Algorithms: Frequently Asked Questions, Section 5—3D Computations," <http://www.exaflop.org/docs/cgafaq/cga5.html>, printed May 14, 2004.

"Curves," Avid Technology, printed Nov. 6, 2003, http://www.iro.umontreal.ca/~roys/softimage/html/model/curves.html, chapter 10, 10 pgs.

"Fundamentals of NURBS Modeling," Avid Technology, printed Nov. 6, 2003, http://www.iro.umontreal.ca/~roys/softimage/html/model/nurbs_basics.html, chapter 9, 7 pgs.

"How to use Postscript Art as a Stencil in Photoshop," *Swanson Tech Support, Photoshop Techniques* 004, 4 pgs., created Jun. 6, 1999.

"Lesson 12: Blur, Sharpen & Smudge," http://iit.bloomu.edu/vthc/Photoshop/enhancing/blurring.htm, 3 pgs., printed Sep. 12, 2003.

"Lesson 14: Selection Tools," http://iit.bloomu.edu/vthc/Photoshop/BLENDING/selectiontools.htm, 7 pgs., printed Sep. 12, 2003.

"Lesson 18: Opacity," http://iit.bloomu.edu/vthc/Photshop/SpecialEffects/opacity/htm, 2 pgs., printed Sep. 12, 2003.

"Lesson 19: Color Selection," http://iit.bloomu.edu/vthc/Photoshop/DRAWING/colorpicker.htm (4 pgs.), printed Sep. 12, 2003.

"Lesson 22: Vector Shapes," http://iit.bloomu.edu/vthc/Photoshop/DRAWING/vectorshapes.htm (5 pgs.), printed Sep. 12, 2003.

"Lesson 23: Gradients," http://iit.bloomu.edu/vthc/Photoshop/DRAWING/gradients.htm (7 pgs.), printed Sep. 12, 2003.

"Lesson 4: Layers," http://iit.bloomu.edu/vthc/Photoshop/Basics/layers.htm (2 pgs.), printed Sep. 12, 2003.

"Lesson 7: Color Balance, " http://iit.bloomu.edu/vthc/Photoshop/enhancing/colorbalance.htm (3 pgs.), printed Sep. 12, 2003.

"Lesson 8: Brightness & Contrast," http://iit.bloomu.edu/vthc/Photoshop/enhancing/brightness&contrast.htm (2 pgs.), printed Sep. 12, 2003.

"Mold Advisor: Mold Design Using 3D Vision Mold Adviser," Tesis, 2pp., available at www.acuityinc.com/pdfs/Mold%20Advisor.pdf<http://www.acuityinc.com/pdfs/Mold%20Advisor.pdf>, undated, created Sep. 11, 2001.

"Moldplus," MACDAC Engineering, <http://www.macdac.com/moldplus/moldplus.htm>, 4 pgs., printed Jul. 28, 2003.

"Phantom Haptic Interface," Brochure of SensAble Devices, Inc., 1995, Cambridge, MA (2 pgs).

"Phantom Haptic Interface," Brochure of SensAble Technologies, Inc., 1996, Cambridge, MA (6 pgs).

"Points, Nets, Patches . . . " printed Nov. 17, 2003, http://www.people.nnov.ru/fractal/splines/nets.htm, 2 pgs.

Powerful Photoshop Layers: Layer Effects Settings, http://www/webreference.com/graphics/column32/5.html (5 pgs.), printed Sep. 12, 2003.

"Raindrop Geomagic, Inc. product description for Geomagic Shape," Oct. 3, 2003 printout, http://www.geomagic.com/products/shape, 2 pgs.

"Raindrop Geomagic, Inc. product description for Geomagic Shape," Nov. 26, 2003 printout, http://www.geomagic.com/products/shape, 2 pgs, Nov. 26, 2003 printout.

"Raindrop Geomagic, Inc. product description for Geomagic Studio," http://www/macdac.com/raindrop/studio.htm (4 pgs.), printed Oct. 3, 2003.

"Revival of the Virtual Lathe," University of Michigan Virtual Reality Laboratory, http://www-vrl.umich.edu/sel_prj/lathe/ (Dec. 20, 2002).

"Sensable Technologies, Feature Overview," Nov. 25, 2003 printout, http://www.sensable.com/products/3ddesign/freeform/overview.asp, 5 pgs.

"Sensable Technologies, Feature Overview: Emboss with Wrapped Image," Nov. 25, 2003 printout, http://www.sensable.com/products/3ddesign/freeform/emboss_with_wrap.asp, 1 pg.

"Sensable Technologies, Free Form Concept System," Jan. 20, 2004 printout, http://www.sensable.com/products/3ddesign/concept/index.asp, 2 pgs.

Surfaces, Avid Technology, printed Nov. 6, 2003, http://www.iro.umontreal.ca/~roys/softimage/html/model/surfs.html, chapter 11, 22 pgs.

"Tensor Product Spline Surfaces," printed Nov. 17, 2003, http://www.ibiblio.org/e-notes/Splines/Inter.htm, 3 pgs.

"The Maya 4.5 Handbook (with CD-ROM) (Graphics Series)," Amazon.com citation. pp. 1-7. http://www.amazon.com/, published Dec. 31, 2002.

"Touch-Enabled 3D Model Design," Department of Computer Science, University of North Carolina at Chapel Hill (Feb. 2002 ), 2 pgs.

Agrawala, M. et al "3D Painting on Scanned Surfaces", Stanford University, 1995, pp. 145-150.

Alejandre, "What is a I essellation?" The Math Forum, Drexel University, printed Jul. 29, 2003, http://mathforum.org/sum95/suzanne/whattess.html, 4 pgs.

Altmann, "About Nonuniform Rational B-Splines—NURBS," Worcester Polytechnic Institute, printed Jul. 29, 2003, http://www.cs.wpi.edu/~matt/courses/cs563/talks/nurbs.html, 6 pgs.

Arraich, "Quick Mask," http://www.arraich.com/ref/aatool_quick_mask6.htm, 3 pgs., printed Sep. 12, 2003.

Atkinson, W. D. et al., "Computing with Feeling" Comput. & Graphics, vol. 2, 1977, pp. 97-103.

Avila et al., "A Haptic Interaction Method for Volume Visualization," GE Corporate Research & Development, Schenectady, NY, pp. 1-9 (1996).

B. A. Marcus, B. An, and B. Eberman, "EXOS Research on Master Controllers for Robotic Devices," Fifth Annual Workshop on Space Operations Applications and Research (SOAR '91) pp. 238-245, Jul. 1991.

Barr, Alan H.; "Global and Local Deformations of Solid Primitives"; Computer Graphics; vol. 18, No. 3, pp. 21-30 (Jul. 1984).

Bentley, "Rendering Cubic Bezier Patches," Worcester Polytechnic Institute, printed Nov. 17, 2003, http://www.cs.wpi.edu/~matt/courses/cs563/talks/surface/bez_surf.html, 10 pgs.

Bergamasco, "Design of Hand Force Feedback Systems for Glove-like Advanced Interfaces", IEEE, Sep. 1992, pp. 286-293.

Birn, "Tutorial: NURBS Head Modeling," printed Jul. 29, 2003, http://www.3drender.com/jbirn/ea/HeadModel.html, 5 pgs.

Blinn, J.F., "Simulation of Wrinkled Surfaces," Computer Graphics, vol. 12-3, Aug. 1978, pp. 286-292.

Bourke, Paul, "Triangulate: Efficient Triangulation Alogirthm Suitable for Terrain Modelling or an Algorithm for Interpolating Irregularly-Spaced Data with Applications in Terrain Modelling," <http://astronomy.swin.edu.au/~pbourke/terrain/triangulate/>, dated Jan. 1989.

Brooks, F. P. et al., "Project GROPE—Haptic Displays for Scientific Visualization," Computer Graphics, vol. 24, No. 4, Aug. 1990, pp. 177-185.

Burdea,G.C., "Force and Touch Feedback for Virtual Reality," John Wiley and Sons, Inc., New York, New York, pp. 190-193 (1996).

Capvidia.BE, "FaceWorks 2.0 tutorial," [best available copy], <http://www.capvidia.be/products/swadd/fw/fw_tutorial.htm>, printed Jul. 28, 2003.

Capvidia.BE, "FaceWorks 2005," <http://www.capvidia.be/index.php?id=23&docinput%5Bdesign%5D=Printable>, printed Apr. 2, 2006.

Colgate et al., "Factors Affecting the Z-Width of a Haptic Display," published by IEEE Computer Society Press, Los Alamitos, California, in Proceedings: 1994 IEEE International Conference on Robotics and Automation, held May 8-13, 1994 in San Diego, California, vol. 4, 1994, pp. 3205-3210.

Colgate et al., "Implementation of Stiff Virtual Walls in Force Reflecting Interfaces," IEEE Virtual Reality Annual International Symposium (Seattle, WA), pp. 202-208 (Sep. 18-22, 1993).

Colgate, J. E. et al., "Factors Affecting the Z-Width of a Haptic Display," published by IEEE Computer Society Press, Los Alamitos, California, in Proceedings: 1994 IEEE International Conference on Robotics and Automation, held May 8-13, 1994 in San Diego, California, vol. 4, 1994, pp. 3205-3210.

Colgate, J. E. et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5-9, 1995 in Pittsburgh, Pennsylvania, 1995, pp. 140-145.

Decaudin, P., "Geometric Deformation by Merging a 3D-Object with a Simple Shape," Graphics Interface '96 Proceedings (Toronto, Canada), 6 pgs. (May 21-24, 1996).

Dworkin, Paul, et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.

Farin, "NURBS," printed Nov. 17, 2003, www.eros.cagd.eas.asu.edu/~farin/rbook/toc.html, 2 pgs.

Feldman, "Texture Mapping," http://www.geocities/com/SiliconValley/2151/tmap.html (22pgs.), printed Nov. 26, 2003.

Fisher et al., "Pixel Values," http://www.dai.ed.ac.uk/HIPR2/value.htm (1 pg.), printed Sep. 12, 2003.

Foskey et al, "*ArtNova*: Touch-Enabled 3D Model Design," Proceedings of IEEE Virtual Reality 2002, Mar. 24-28, 2002, Orlando, Florida pp. 119-126.

Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).

Galyean, T.A., "Sculpting: An Interactive Volumetric Modeling Technique," Computer Graphics (SIGGRAPH '91 Las Vegas), vol. 25, No. 4, pp. 267-274 (Jul. 1991).

Gibson, Beyond Volume Rendering: Visualization, Haptic Exploration, and Physical Modeling of Voxel-Based Objects, 1995 Mitsubishi Electric Research Laboratories, Inc., 1995, 6th Eurographics Workshop on Visualization in Scientific Computing, pp. 1-14.

Gu et al., "Global Conformal Surface Parameterization," Eurographics Symposium on Geometry Processing (2003), 12 pgs.

Gueziec, Andre, "Efficient Compression of Non-manifold Polygonal Meshes," Multigen-Pradign, Inc., Thursday, Nov. 4, 1999, UCDavis Colloquium, <http://www.cs.ucdavis.edu/department/colloquia/99-00/gueziec.html>, printed Jul. 28, 2003.

H. Inoue, Y. Tsusaka and T. Fukuizumi, "Parallel Manipulator," Proceedings of 3rd Robotics Research: The Third International Symposium, Faugeras & Giralt, eds., MIT Press 1986.

H. Iwata, "Pen-based Haptic Virtual Environment," Proceedings of IEEE Virtual Reality Annual International Symposium, (Sep. 18-22, 1993, Seattle, WA), pp. 287-292.

Hashimoto et al., "Dynamic Force Simulator for Force Feedback Human-Machine Interaction", IEEE, Sep. 1993, pp. 209-215.

Hirata, Yukihiro et al., "3-Dimensional Interface Device for Virtual Work Space," Proceedings of the 1992 IEEE, Jul. 7-10, 1992, pp. 889-896.

Hirota et al., "Providing Force Feedback in Virtual Environments", IEEE, Sep. 1995, pp. 22-30.

Hirota, K. et al., "Development of Surface Display," Proceedings of the Virtual Reality Annual International Symposium (Seattle), pp. 256-262 (Sep. 18-23, 1993).

Howe, Robert D. et al., "Task Performance with a Dextrous Teleoperated Hand System," Telemanipulator Technology, Nov. 1992, Proceedings of SPIE, vol. 1833, pp. 1-9.

Immersion Corporation Website, Immersion Corporation, 1997, 4 pgs. (not admitted as prior art).

Immersion Corporation, "Impulse Engine 2000," http://www.immerse.com/WWWpages/IE2000pg.htm, 2 pages (1997).

Immersion Corporation, "Laparoscopic Impulse Engine : A New Force Feedback Surgical Simulation Tool", Immersion Corporation, 1995.

Immersion Corporation, "Medical Simulation," 1 page, (undated).

Immersion Corporation, "The Impulse Engine", Immersion Corporation, 1996.

Immersion Corporation, "Virtual Laparoscopic Interface", Immersion Corporation, 1995, 1 pg.

Ishii et al., "A 3D Interface Device with Force Feedback: A Virtual Work Space for Pick-and-Place Tasks", IEEE, Sep. 1993, pp. 331-335.

Iwata, "Artificial Reality with Force-feedback: Development of Desktop Virtual Space iwth Compact Master Manipulator," Computer Graphics (SIGGRAPH '90 Dallas), vol. 24, No. 4, pp. 165-170 (Aug. 1990).

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.

Komerska et al., "Haptic Interface for Center-of-Workspace Interaction: Demonstration Paper," *Haptics Interfaces for Virtual Environments and Teleoperator Systems (2002)*, pp. 352-353.

Komerska et al., "Haptic Task Constraints for 3D Interactions," *Proceedings, IEEE Haptics Interfaces for Virtual Environments and Teleoperator Systems*, (Mar. 22-23, 2003), pp. 270-277.

Kotoku, T., et al., "A Force Display Algorithm for Virtual Environments," SICE, pp. 347-355, 1992.

Kraft Ocean Systems, "Grips Underwater Manipulator System".

Kraft Telerobotics, Inc., "GRIPS Force Feedback Manipulator Systems," Kraft Telerobotics, Inc.

Kraft Telerobotics, Inc., "GRIPS Master/Slave Manipulator System," Kraft Telerobotics, Inc., 1988.

Lenzmeier, "Color Depth and Color Spaces," http://www.csbsju.edu/itservices/teaching/c_space/colors.htm (3 pgs.).

Lewis, P.H., "Electronic Pen With Its Own Eraser", Personal Computers, Jul. 1995, p. C8.

Massie, T. H., "Design of a Three Degree of Freedom Force-Reflecting Haptic Interface", Massachusetts Institute of Technology; Bachelor of Science in Electrical Science and Engineering Thesis, May 1993, pp. 1-38.

Massie, T. H., "Initial Haptic Explorations with the Phantom: Virtual Touch Through Point Interaction", Massachusetts Institute of Techonology Master of Science Thesis, Feb. 1996, pp. 1-49. (not admitted as prior art).

McAffee, Douglas A. and Ohm, Timothy, "Teleoperator Subsystem/Telerobot Demonstrator," Force Reflecting Hand Controller Equipment Manual, Jet Propulsion Laboratory, Jan. 1988.

Miller et al., "The Design of 3D Haptic Widgets," Proceedings of the 1999 Symposium on Interactive 3D Graphics Conference Proceedings, (1999) pp. 1-6.

Millman et al., "A System for the Implementation and Kinesthetic Display of Virtual Environments," Telemanipulator Technology, Proceedings of 1992 SPIE, vol. 1833, pp. 49-56.

Minsky, M. et al., "Feeling and Seeing: Issues in Force Display," Computer Graphics, vol. 24, No. 2, Mar. 1990, pp. 235-270.

Minsky, M., "Computational Haptics: The Sandpaper System for Synthesizing Texture for a Force-Feedback Display," Massachusetts Institute of Technology Ph.D. Thesis, Jun. 1995, pp. 1-217.

Morgenbesser, H. B., "Force Shading for Shape Perception in Haptic Virtual Environments", Massachusetts Institute of Technology Master of Engineering Thesis, Sep. 1995, pp. 1-77.

Nagel, "A Closer Look: Photoshop's New Paint Engine, p. 2 of 3," Mar. 7, 2002, http://www.creativemac.com/2002/03_mar/features/ps7dynamics1.htm (6 pgs.).

Nagel, "A Closer Look: Photoshop's New Paint Engine," Mar. 7, 2002, http://www.creativemac.com/2002/03_mar/features/ps7dynamics1.htm (5 pgs.).

O'Rourke, "Comp.Graphics.Algorithms Frequently Asked Questions, Section 5. 3D Computations," http://www.exaflop.org/docs/cgafaq/cga5.html (13 pgs.), printed Sep. 10, 2003.

Payne et al., "Distance Field Manipulation of Surface Models," IEEE Computer Graphics & Applications, pp. 65-71 (Jan. 1992).

Porter et al., "Compositing Digital Images," Computer Graphics, vol. 18, No. 3, Jul. 1984, pp. 253-259.

Rea, "Digital Photography and Electronic Imaging Glossary," Version 7.5.2 (Aug. 2000), 40 pgs.

Rogers, "An Introduction to NURBS," *Morgan Kaufmann Publishers*, (2000), pp. 1-4.

Salcudean S. E. et al., "On the Emulation of Stiff Walls and Static Friction with a Magnetically Levitated Input/Output Device," Dynamic Systems and Control: vol. 1, DSC-vol. 55-1, 1994, pp. 303-309.

Salisbury et al., Haptic Rendering: Programming Touch Interaction with Virtual Objects, ACM, 1995, pp. 123-130.

Salisbury, K. et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Technologies, Inc. "Phantom Haptic Interface," 1996, Cambridge, MA (6 pgs.).

Sharman, "The Marching Cubes Algorithm," http://www.exaflop.org/docs/marchcubes/ind.html (6 pgs.).

Shimoga, K. B., "A Survey of Perceptual Feedback Issues in Dextrous Telemanipulation: Part I. Finger Force Feedback" published by IEEE Neural Networks Council in IEEE Virtual Reality Annual International Symposium, held Sep. 18-22, 1993 in Seattle, Washington, 1993, pp. 263-270.

Snow, E. et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sorkine, et. al, "Bounded-distortion Piecewise Mesh Parameterization," Proceedings of the Conference on Visualization 2002, Boston, Massachusetts, pp. 355-362.

Sutter, P.H., J. C. latridis and N. V. Thakor, "Response to Reflected-Force Feefback to Fingers in Teleoperations," Proc. of the NASA Conf. on Space Telerobotics, pp. 65-74, NASA JPL, Jan. 1989.

Swarup, N., "Haptic Interaction with Deformable Objects Using Real-Time Dynamic Simulation", Massachusetts Institute of Technology, Sep. 1995, pp. 1-83.

Tanie, K., et al., "Force Display Algorithms", 1993 IEEE International Conference on Robotics and Automation, May 2-7, 1993, Atlanta Georgia, USA, 1993, pp. 60-78.

Terzopoulos, D. et al.; "Elastically Deformable Models"; Computer Graphics, vol. 21, No. 4, pp. 205-214 (Jul. 1987).

Wang, S.W. and Kaufman, A.E., "Volume Sculpting", 1995 Symposium on Interactive 3D Graphics, Monterey, California, pp. 151-156.

Wang, S.W. et al., "Volume Sculpting," 1995 Symposium on Interactive 3D Graphics (Monterey, CA), pp. 151-156 (1995).

Watkins, Adam. "The Maya 4.5 Handbook." Charles River Media, Inc. (c) 2003. ISBN 1-58450-234-7. pp. 332-336.

Weisstein, "Conformal Mapping," Wolfram Research, printed Nov. 11, 2003, http://mathworld.wolfram.com/ConformalMapping.html, 7 pgs.

Y. Adachi, "Touch and Trace on the Free-Form Surface of Virtual Object," Proceedings of IEEE Virtual Reality Annual International Symposium, Sep. 18-22, 1993, Seattle WA, pp. 162-168.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles, C. B. et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, C. B., "Haptic Rendering with the Toolhandle Haptic Interface," Massachusetts Institute of Technology Master of Science Thesis, May 1995, pp. 1-46.

"Mastering Windows 3.1 Special Edition", by Robert Cowart, Chapter 11, 1993 SYBEX Inc.

Open Inventor 2.1 Performance Tips, released Apr. 1996, p. 4, 6 and 8.

Open Inventor 4.0 Release Notes, released Apr. 2003, p. 5.

Seeger et al. "Controlling Force Feedback Over a Network" published as part of the Proceedings of the Second Phantom Users Group Workshop, Dec. 1997.

US 5,903,456, 05/1999, Schena et al. (withdrawn)

METHOD AND APPARATUS FOR GENERATING AND INTERFACING WITH A HAPTIC VIRTUAL REALITY ENVIRONMENT

CROSS-REFERENCE TO RELATED APPLICATIONS

This application is a continuation application of U.S. patent application Ser. No. 09/574,131, filed May 18, 2000, now U.S. Pat. No. 7,319,466 which is a continuation application of U.S. patent application Ser. No. 08/691,247, filed Aug. 2, 1996, and issued on Jul. 4, 2000, as U.S. Pat. No. 6,084,587, the entire contents of which are incorporated by reference herein.

FIELD OF THE INVENTION

The invention relates generally to methods for defining a virtual reality environment and more specifically to methods for haptically creating and manipulating objects within a virtual reality environment.

BACKGROUND OF THE INVENTION

Virtual Reality (VR) is an artificial environment constructed by a computer which permits the user to interact with that environment as if the user were actually immersed in the environment. Early VR devices permitted the user to see three dimensional (3D) depictions of an artificial environment and to move within that environment. Thus a VR flight simulator incorporating such a device would allow a user to see a 3D view of the ground, which changed both as the virtual aircraft passed over the virtual ground and as the user's eyes looked in different directions. What the user saw in such a simulator is what a pilot would see when actually flying an aircraft.

The reality of the VR environment was enhanced by the ability of a user to manipulate virtual objects within the virtual environment using hand motions and gestures. Special gloves and devices were developed which permitted the user to interact with the virtual objects within the virtual environment. In such a system the user typically saw an image of his or her hand within the virtual environment and was able to determine where in the virtual environment the user's hand was relative to the virtual object to be manipulated. Moving the glove or device resulted in a corresponding movement of the hand image in the virtual environment. Thus a user wearing the special gloves or using the special device would cause virtual objects to move, simply by moving the glove in such a way that the virtual object is touched by the image of the hand in the virtual environment.

The addition of force generators to the gloves or devices further enhanced the reality of VR by providing to the user with a tactual response to interacting with virtual objects within the virtual environment. For example a user moving such a force generation enhanced device in a direction such that the image of the device moved toward a virtual wall in the virtual environment, would experience a stopping force when the image of the device in the virtual environment collided with the virtual wall. Such tactual sensation creating devices, or haptic devices, thus provided a stimulus to another of the user's senses.

Although the early VR devices were oriented to providing realistic graphical interfaces, the progress in haptic VR devices has made it possible to define a haptic VR environment which may be completely independent of the graphical VR environment. As such, haptic VR environments may now be constructed which respond to manipulation by the user in the way that the early graphical VR environments responded to the visual actions of a user.

This ability to define a haptic VR space independently of a graphical, or other space, provides a greater degree of flexibility in the design and creation of such VR environments. The present invention seeks to further add to this flexibility.

SUMMARY OF THE INVENTION

The invention relates to a method for generating a haptic interactive representation. The method includes defining a haptic interaction space and building a hierarchical construct for use within the haptic interaction space. In one embodiment the step of building the hierarchical construct for use within the haptic interaction space includes the step of creating a hierarchical representation of an object using a plurality of underlying constructs. The hierarchical representation of the object may be created in the haptic interaction space or outside of the haptic interaction space and then placed into the haptic interaction space.

The underlying constructs include geometric representations, of the same or dissimilar form. Such representations include primitive objects, polygonal objects, algebraic objects, constructed solid geometry objects, algebraic surface representations and volumetric object representations. Other underlying constructs include constructs associated with translation parameters, rotation parameters, scaling parameters, mass parameters, velocity parameters, acceleration parameters, angular velocity parameters, angular acceleration parameters, friction parameters, texture parameters, viscosity parameters, and compliance parameters.

In one embodiment, the invention includes a method for determining forces to be applied to a user through a haptic interface. The method includes generating a haptic interactive representation including a virtual object in a haptic interaction space, sensing a position of a user in real space, determining a haptic interface location in the haptic interaction space in response to the position of the user in real space and determining whether the virtual object collides with the haptic interface location. If the virtual object does not collide with the haptic interface location, a force to be applied to the user in real space in response to the haptic interface location is calculated. If the virtual object collides with the haptic interface location, a proposed surface contact point for the virtual object based on the haptic interface location is determined and a force to be applied to the user in real space, in response to the proposed surface contact point, is calculated.

In another embodiment the method includes determining forces to be applied to a user through a haptic interface by generating a haptic interactive representation including at least two virtual objects in a haptic interaction space, sensing a position of a user in real space, determining a current haptic interface location in the haptic interaction space in response to the position of the user in real space and determining whether each of the virtual objects collides with the haptic interface location. If none of the virtual objects collide with the haptic interface location, a force to be applied to the user in real space in response to the haptic interface location is calculated. If only one of the virtual objects collides with the haptic interface location, a proposed surface contact point for that virtual object colliding with the haptic interface location is determined, and a force to be applied to the user in real space, in response to the proposed surface contact point, is calculated. If more than one of the virtual objects collide with the haptic interface location, a proposed surface contact point for each of the virtual objects colliding with said haptic interface location is determined to thereby define a plurality of proposed surface contact points. A force to be applied to the user in real space, in response to the plurality of proposed surface contact points, is then calculated.

The invention also relates to a method for interacting with a haptic process. The method includes the steps of creating a haptic process having the haptic interactive representation, associating a callback with the haptic process, connecting to a second process which interacts with the haptic process and associating the callback, which is associated with the haptic process, with the second process. The method further includes requesting the callback by the second process, and returning, by the haptic process through the callback to the second process, at least one parameter associated with the haptic interactive representation.

In one embodiment the step of creating a haptic process includes the steps of defining a haptic interaction space, and building a hierarchical construct for use within the haptic interaction space. In another embodiment the step of connecting to the second process includes the steps of establishing a communications link between the haptic process and the second process, and permitting the haptic process and the second process to communicate over the communications link.

In one embodiment the communications link is a computer network and the second process is active on a node different from the haptic process. In one embodiment the second process is a graphics process and the at least one parameter includes graphical data. In another embodiment the second process is a second haptic interactive process and the at least one parameter is comprises haptic data.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

Like reference characters in the respective drawn figures indicate corresponding parts.

DETAILED DESCRIPTION OF THE INVENTION

Figure 1:
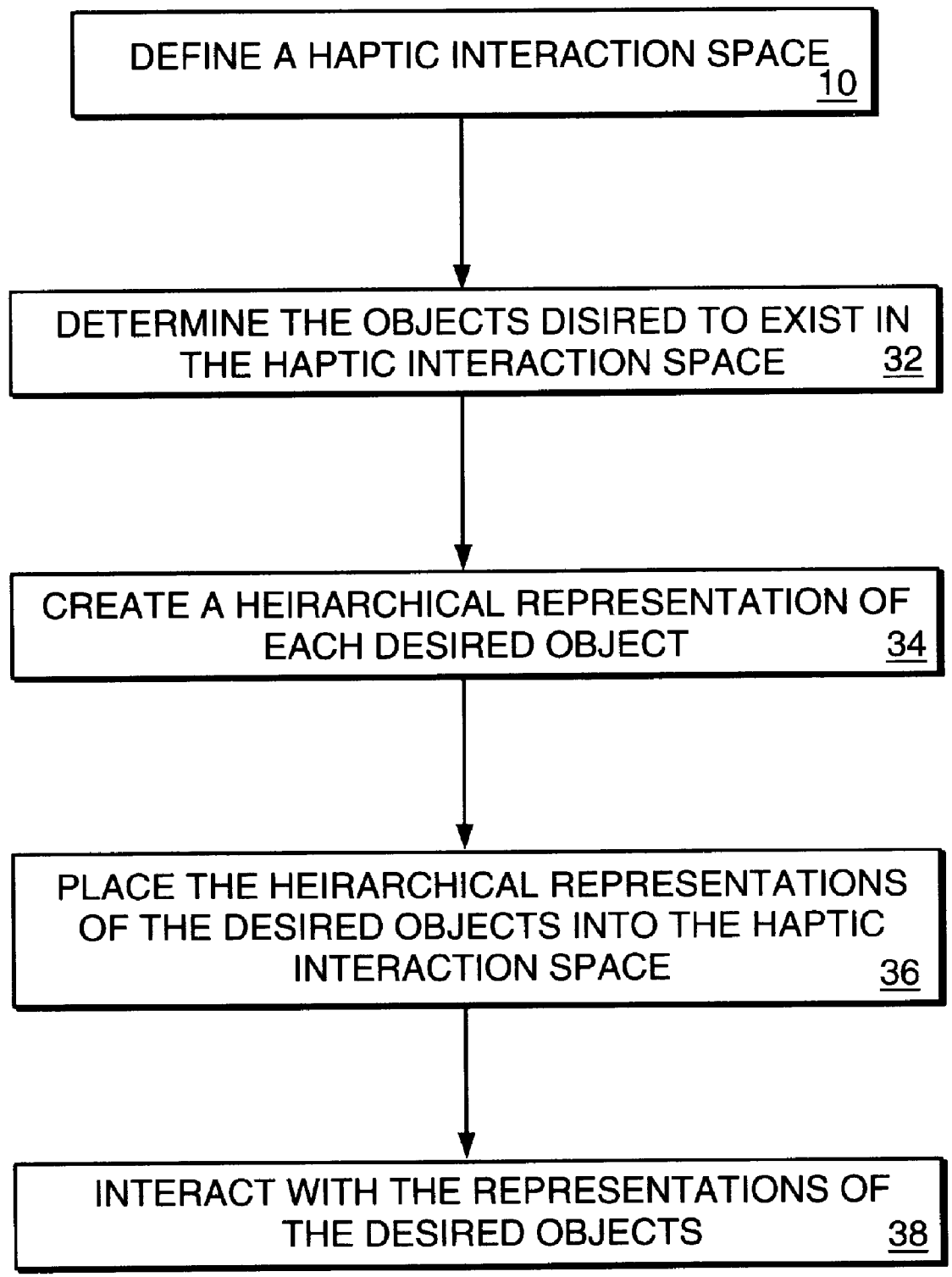
FIG. 1 is a flowchart representation of an embodiment of a process for generating a haptic interactive representation.

In brief overview, the flowchart of FIG. 1 shows the steps performed by one embodiment of the method of the present invention for generating a haptic interactive representation. As used herein, a "haptic interactive representation" is defined as a computer generated virtual environment which can be explored by a user through the sense of touch. First, (step 10) a haptic rendering application defines a haptic interaction space. As used herein, "haptic rendering" is defined as the creation of a virtual environment with which a user can interact through the sense of touch. "Haptic rendering application" refers to the computer application which generates the virtual environment and determines the forces to be applied to a user through a haptic interface. The haptic rendering application generates representations of real world objects in the virtual environment. As used herein, "haptic interaction space" is defined as the region in the computer generated virtual environment with which the user can interact through the sense of touch. The haptic interaction space defines the boundaries of the haptic interactive representation with which the user can interact. In one embodiment, the haptic interaction space is a two-dimensional region. In another embodiment, the haptic interaction space is a three-dimensional region. The user selects the desired dimensions for the haptic interaction space.

Figure 2:
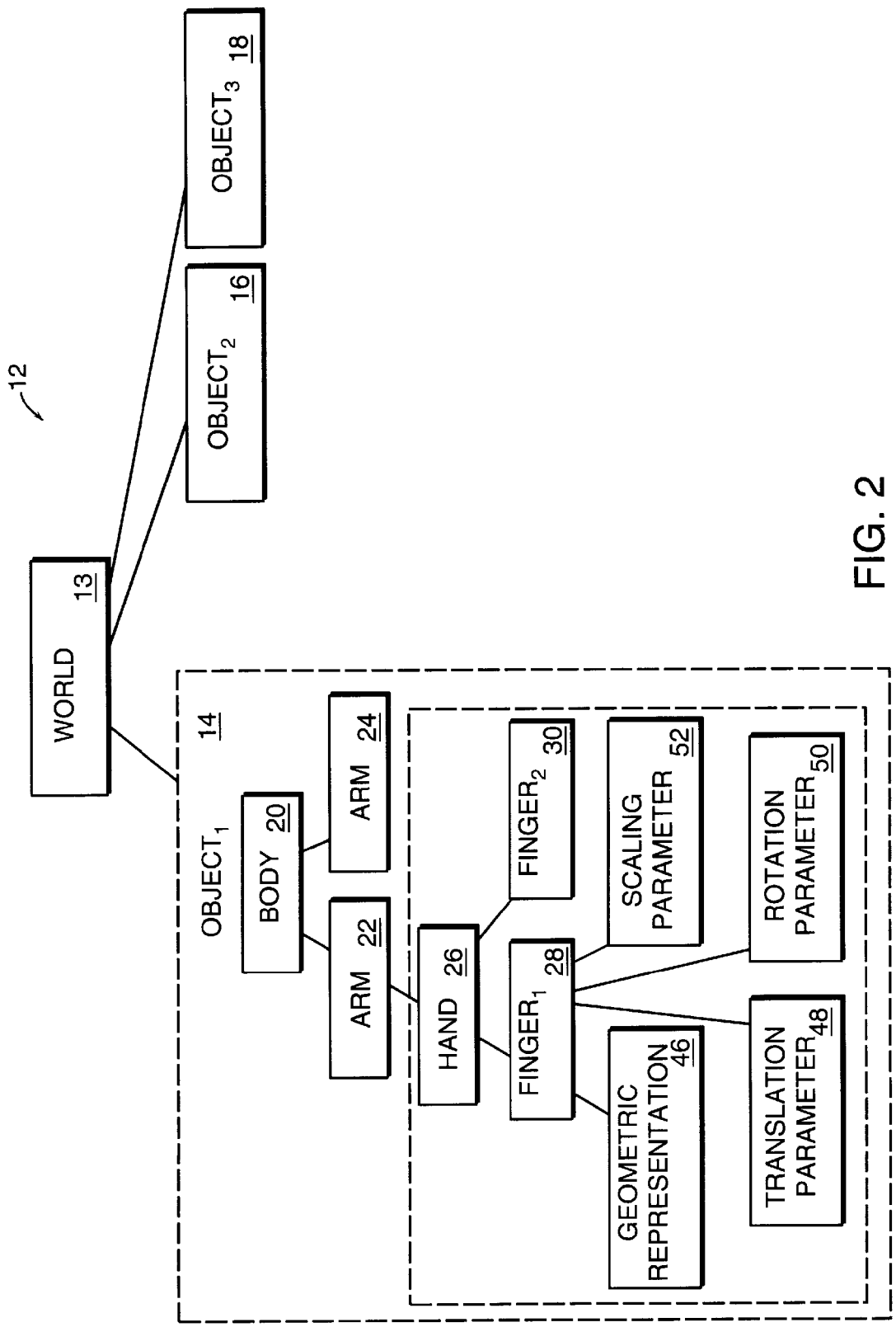
FIG. 2 is a pictorial view of an embodiment of a hierarchical construct for use within a haptic interaction space.

After the user has defined the haptic interaction space, the user builds a hierarchical construct for use within the haptic interaction space. The hierarchical construct provides the virtual environment for interaction with the user. Hierarchical constructs are used to model objects that are made up of several parts which are linked together and which can interact with each other. FIG. 2 shows an example of a hierarchical construct 12 for use within a haptic interaction space. The hierarchical construct 12 is a model of a virtual world 13 which contains three virtual objects 14, 16 and 18. The world 13 is a hierarchical construct because the world 13 is made up of parts (i.e. the three objects 14, 16, 18), the parts consist of subparts, and so on. The three objects 14, 16 and 18 are sub-constructs of the hierarchical construct 12. Each of the sub-constructs 14, 16 and 18 are composed of a plurality of further underlying sub-constructs which are linked together to form a hierarchy. For example, $OBJECT_1$ 14 is a virtual representation of a body 20. The body 20 includes two arms 22, 24. The arms 22, 24 are sub-constructs or "children" of the body 20 which are linked together to form the body 20. As used herein, a "child" is a sub-construct that has a position and orientation which is dependent upon the position and orientation of a construct higher up in the hierarchy. The arms 22, 24 are children of the body 20 because the position and orientation of the arms 22, 24 are dependent upon the position of the body 20. The arm 22 includes a hand 26, which includes two fingers 28, 30. The two fingers 28, 30 are sub-constructs or children of the hand 26 and the hand 26 is a sub-construct or child of the arm 22.

Referring again to FIG. 1, to build the hierarchical construct, in step 32 the user determines the real world objects that the user desires to exist in the haptic interaction space. Each of these desired objects are sub-constructs of the hierarchical construct representing the entire haptic interactive representation. In step 34, the user creates a hierarchical representation of each of the desired objects. Next, in step 36 the user places the hierarchical representations of the desired objects into the haptic interaction space to create the haptic interactive representation. In another embodiment, the user creates the hierarchical representation directly in the haptic interaction space. After the user creates the haptic interactive representation, in step 38 the user may interact with the representations of the desired objects within the haptic interaction space.

Figure 1A:
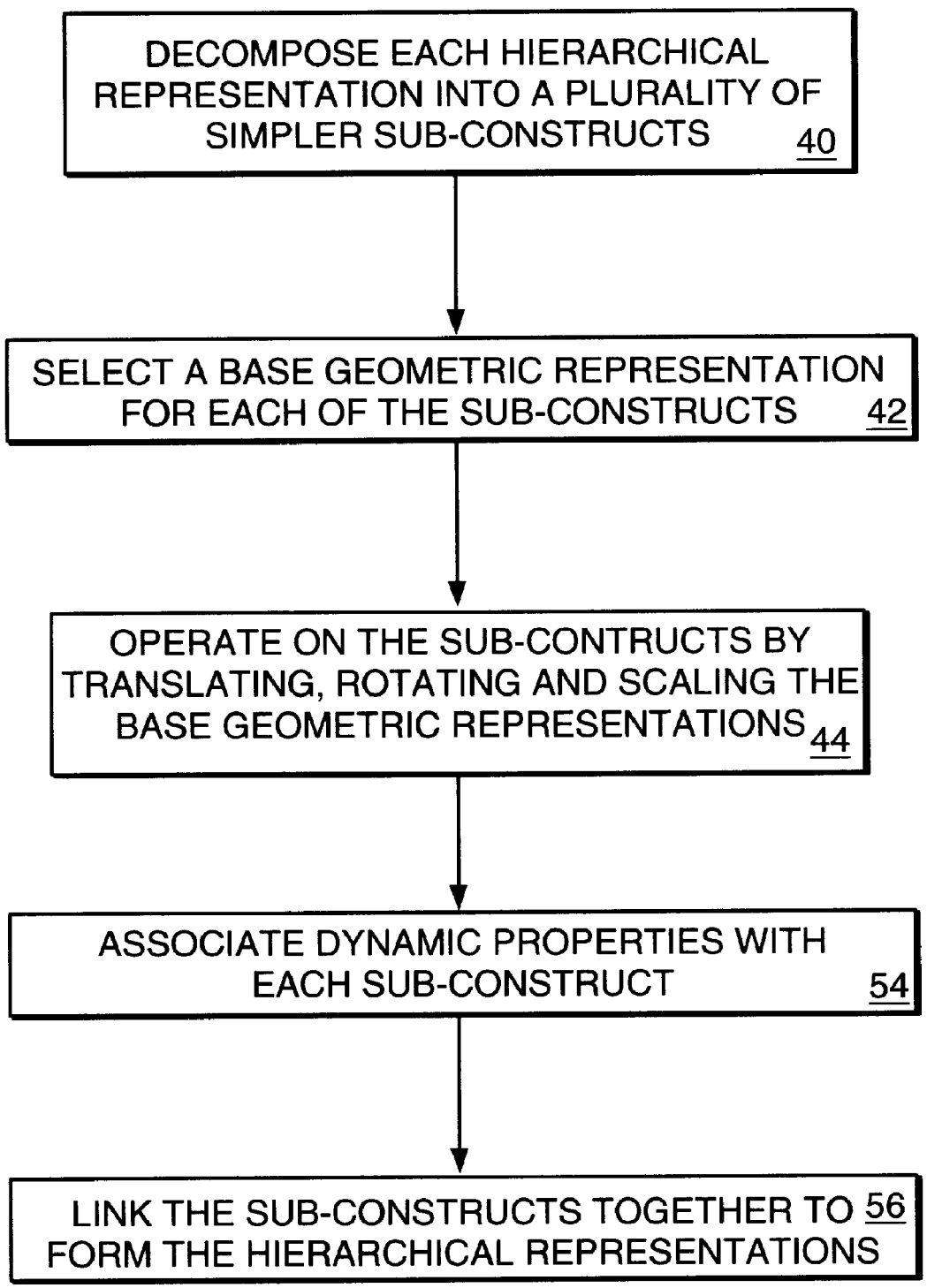
FIG. 1A is a flowchart representation of an embodiment of a process for creating a hierarchical representation of an object.

In more detail and referring to FIG. 1A, a flowchart illustrates a more detailed sequence of steps performed by a user in one embodiment of the present invention to create a hierarchical representation of each of the objects the user desires to exist in the haptic interaction space. In step 40, the user decomposes each hierarchical representation into a plurality of simpler sub-constructs. In the example illustrated in FIG. 2, the hierarchical representation of the body 20 is decomposed into simpler sub-constructs which include the arms 22, 24, the hand 26, and the fingers 28, 30. After decomposing each hierarchical representation into a plurality of sub-constructs, the user builds each of the sub-constructs using a plurality of underlying constructs. The underlying constructs include the attributes and properties that a user may use to build the sub-constructs. The underlying constructs affect how the object appears in the haptic interaction space. For example, the set of underlying constructs the user may select from to build the sub-constructs include geometric representations, translation parameters, rotation parameters, and scaling parameters. Similarly, the underlying representations may also include mass parameters, velocity parameters, acceleration parameters, angular velocity parameters, angular acceleration parameters, friction parameters, texture parameters, viscosity parameters and compliance parameters.

In step 42, the user selects a base geometric representation for each of the sub-constructs. As used herein, a "geometric representation" is defined as a geometric shape. The geometric representation for each sub-construct may be a primitive object, a polygonal object, an algebraic object, a constructed solid geometry object, a volumetric object representation or a representation utilizing Octree decompositions of the haptic interaction space. Examples of primitive objects include lines, circles and curves. Polygonal objects are objects created by linking polygons. Algebraic objects are objects that are defined by an algebraic equation. Volumetric objects are objects which are formed by filling a region of the haptic interaction space with a volume and removing pieces of that volume to form a shape. An Octree object is one defined by successively dividing haptic spaces into octants until a predetermined volume element, voxel, resolution is reached. At this resolution, each voxel is marked to indicate whether the volume element contains a portion of the object. In one embodiment, the geometric representations used to build the sub-constructs are of dissimilar form. For example, one sub-construct in the haptic interactive representation may utilize a primitive object as its base geometric representation, while a second sub-construct utilizes an algebraic object as its base geometric representation.

After selecting a base geometric representation for each of the sub-constructs, in step 44 the user operates on the sub-constructs by translating, rotating and scaling the geometric representations. If the user did not operate on the sub-constructs, each of the sub-constructs would be located at a default position within the haptic interactive representation, and would have a default orientation and a default size. For example, in the hierarchical construct shown in FIG. 2, the sub-construct $FINGER_1$ 28 has a base geometric representation 46. In one embodiment, the base geometric representation 46 is a sphere. The user then associates a translation parameter 48, a rotation parameter 50 and a scaling parameter 52 with the sub-construct $FINGER_1$ 28. Associating the translation parameter 48, the rotation parameter 50 and the scaling parameter 52 with the sub-construct $FINGER_1$ 28 has the effect of translating the geometric representation to the desired position within the haptic interactive representation, rotating the geometric representation to the desired orientation and scaling the geometric representation until it more closely resembles a finger. To cause the geometric representation to more closely resemble a finger in shape, the user may scale one point of the sphere until the sphere is more oblong in shape.

In another embodiment, the user may associate a stiffness, compliance, and friction parameter with each sub-construct.

After the user translates, rotates and scales the geometric representations, in step 54 the user may associate dynamic properties with each sub-construct. The dynamic properties that a user may associate with each sub-construct include velocity, acceleration, angular velocity and angular acceleration. Finally, in step 56, the user links the sub-constructs together to form the hierarchical representations of the desired objects.

Figure 3:
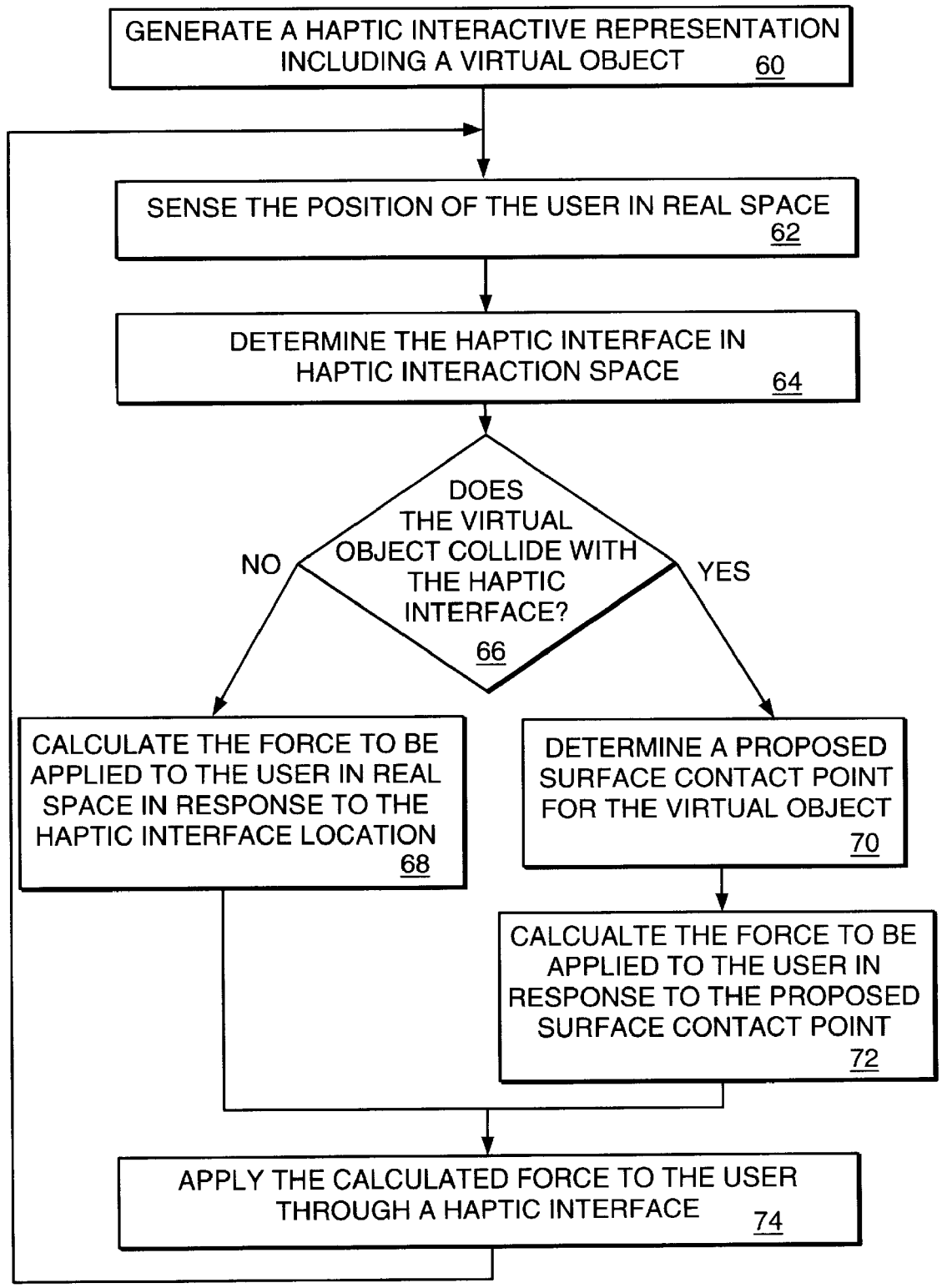
FIG. 3 is a flowchart representation of an embodiment of a process for determining a feedback force to be applied to a user through a haptic interface when the haptic interactive representation contains only one virtual object.

Referring now to FIG. 3, a flowchart shows the steps performed by one embodiment of the method of the present invention for determining the forces to be applied to a user through a haptic interface device. In step 60, the haptic rendering application generates a haptic interactive representation which includes only one representation of a real world object. As used herein, "virtual object" is defined as the representation of a real world object in the haptic interactive representation. In one embodiment, the virtual object is a hierarchical representation of a real world object. The user may create the hierarchical representation of the object using underlying constructs as described above. In the embodiment illustrated by the flowchart in FIG. 3, the haptic interactive representation contains only one virtual object. The haptic interactive representation may contain more than one object. An embodiment of a haptic interactive representation containing more than one virtual object will be described in more detail below.

In step 62, sensors of the haptic interface system sense the position of the user in real space. As used herein, "real space" is defined as the real world environment. In step 64, the haptic rendering application utilizes the information obtained by the sensors to determine the haptic interface in haptic interaction space. The location of the haptic interface describes the position of the user in the haptic interaction space. In step 66, the haptic rendering application determines whether the virtual object collides with the haptic interface location. A virtual object "collides" with the haptic interface location if the surface of the virtual object is in contact with the haptic interface location or if the virtual object encompasses the haptic interface location. If the virtual object does not collide with the haptic interface location, in step 68 the haptic rendering application calculates the force to be applied to the user in real space in response to the haptic interface location. If the virtual object collides with the haptic interface location, in step 70 the haptic rendering application determines a proposed surface contact point (SCP) for the virtual object. The surface contact point represents the location on the surface of the virtual object at which the haptic interface would be located if the haptic interface could be prevented from penetrating virtual objects. The purpose of the surface contact point is to enable the haptic rendering application to accurately determine the forces to be applied to the user in real space. The methods used to determine the proposed surface contact point will be described in more detail below.

After the haptic rendering application determines the proposed SCP for the virtual object, in step 72 the haptic rendering application calculates the force to be applied to the user in real space based on the location of the proposed SCP. After the haptic rendering application has calculated the force to be applied to the user in either step 68 or step 72, in step 74 this force may be generated and applied to a user in real space through a haptic interface device. After the force has been applied to the user, the haptic rendering application repeats steps 62, 64, 66, 68, 70, 72 and 74 for the duration of time that the user interacts with the haptic interactive representation.

Figure 4:
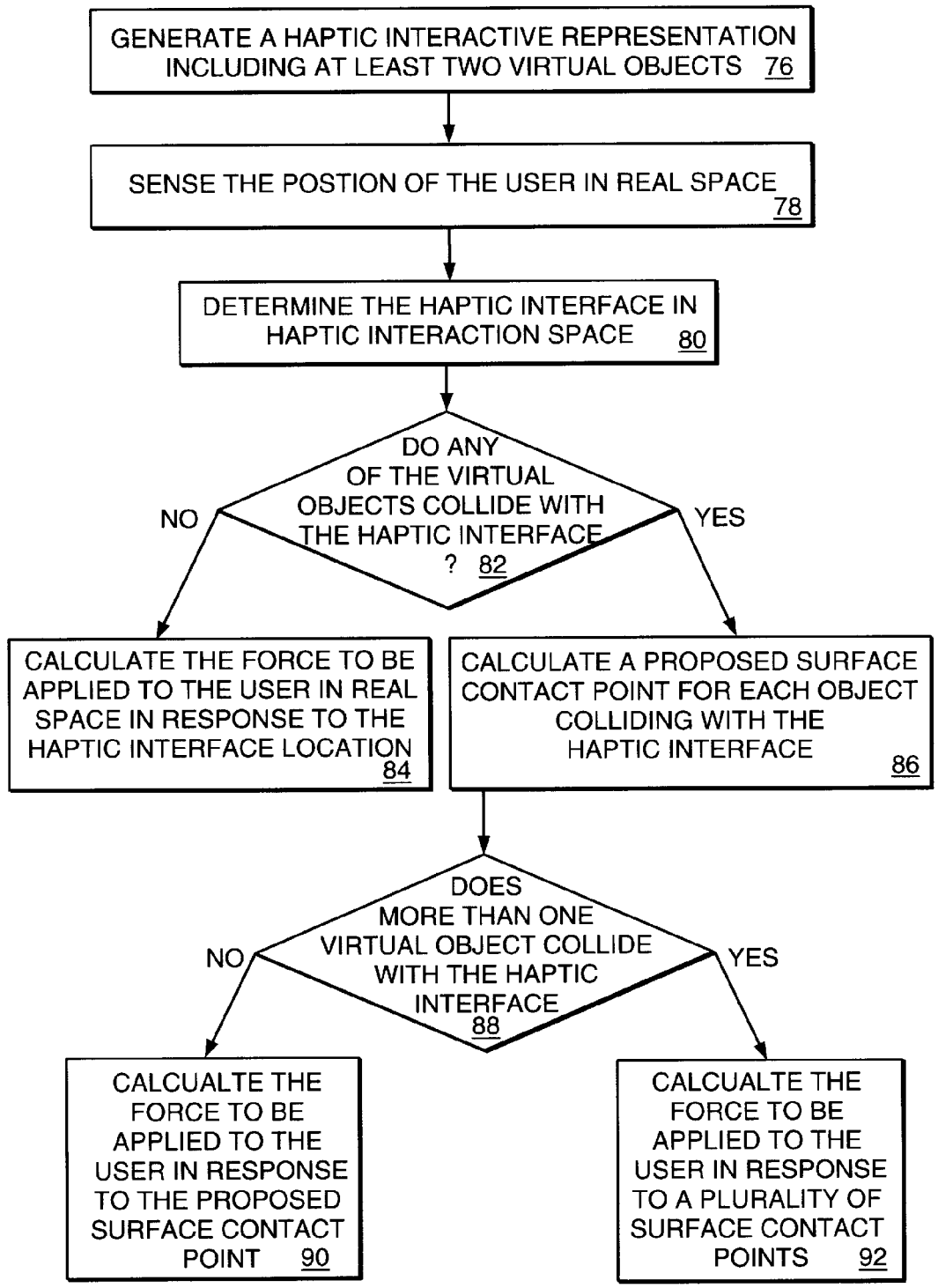
FIG. 4 is a flowchart representation of an embodiment of a process for determining a feedback force to be applied to a user through a haptic interface when the haptic interactive representation contains a plurality of virtual objects.

FIG. 4 shows a flowchart illustrating the steps performed by another embodiment of the method of the present invention for determining the forces to be applied to a user through a haptic interface device. In the embodiment illustrated by the flowchart of FIG. 4, the user's interactions with the haptic interactive representation are reduced to those of a point interacting with three dimensional objects in a three dimensional virtual environment. In other embodiments, the user's interactions are not reduced to those of a point interacting with three dimensional virtual objects. In other embodiments, the haptic interface may be a set of points. In still other embodiments, the haptic interface may be a three-dimensional object.

In step 76, the haptic rendering application generates a haptic interactive representation which includes at least two representations of virtual objects. Once the haptic rendering application has generated a haptic interactive representation which includes at least two virtual objects, in step 78 the haptic interface device senses the position of the user in real space. In step 80, the haptic rendering application uses the position of the user in real space to determine the location of the haptic interface in the haptic interaction space. When the user changes position, the haptic interface device senses this change in position and the haptic rendering application updates the location of the haptic interface in haptic interaction space to reflect the change of the user's position in real space.

Once the haptic rendering application determines the location of the haptic interface, in step 82 it determines whether any of the virtual objects collide with the haptic interface location. A method for determining whether a virtual object collides with the haptic interface location will be discussed in more detail below. If no virtual objects collide with the haptic interface, in step 84 the haptic rendering application calculates the force to be applied to the user in real space based on the location of the haptic interface. If at least one of the virtual objects collides with the haptic interface location, in step 86 the haptic rendering application calculates a proposed surface contact point (SCP) for each virtual object colliding with the haptic interface location. In step 88, the haptic rendering application determines if more than one virtual object collides with the haptic interface location. If only one virtual object collides with the haptic interface location, in step 90 the haptic rendering application calculates a force to be applied to the user in real space in response to the proposed SCP. If more than one virtual object collides with the haptic interface location, in step 92 the haptic rendering application calculates a force to be applied to a user in real space in response to the set of proposed SCPs. The method for determining the SCP to use to calculate the force will be described in more detail below in the discussion of FIG. 5.

Figure 5:
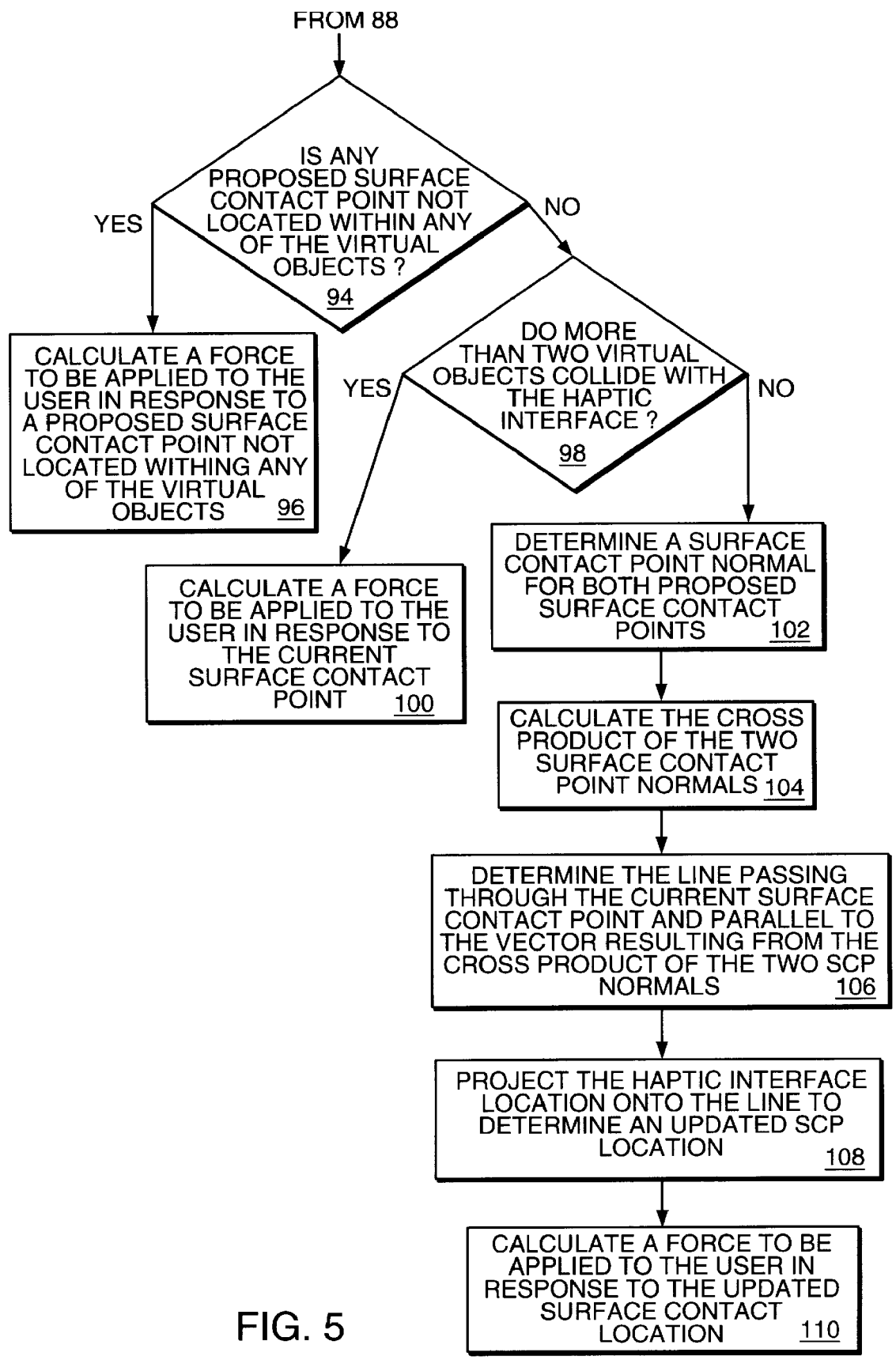
FIG. 5 is a flowchart representation of an embodiment of a process for determining a feedback force to be a applied to a user through a haptic interface when more than one virtual object collides with the haptic interface location.

FIG. 5 shows a flowchart illustrating the steps performed by one embodiment of the method of the present invention for determining a force to be applied to a user through a haptic interface when more than one virtual object collides with the haptic interface location. As discussed above, when more than one virtual object collides with the haptic interface location the haptic rendering application determines a proposed SCP for each virtual object colliding with the haptic interface location. In step 94, the haptic rendering application determines if any of the proposed SCPs is not located within any of the virtual objects in the haptic interactive representation. If at least one of the proposed SCPs is not located within any of the virtual objects, in step 96 the haptic rendering application calculates a force to be applied to the user in response to that proposed SCP. If more than one proposed SCP is not located within any of the virtual objects, the haptic rendering application will use the first SCP it determines not to be located within any of the virtual objects to calculate the force to be applied to the user.

If all of the proposed SCPs are located within at least one virtual object, in step 98 the haptic rendering application determines if more than two virtual objects collide with the haptic interface location. If more than two virtual objects collide with the haptic interface, in step 100 the haptic rendering application discards the proposed SCPs and calculates a force to be applied to the user in response to the current SCP. If only two virtual objects collide with the haptic interface location, in step 102 the haptic rendering application determines a surface contact point normal for both proposed surface contact points. As used herein, a "surface contact point normal" is the vector normal to the surface of the virtual object at the location of that object's proposed SCP. In step 104, the haptic rendering application calculates the cross product of the two surface contact point normals to determine a vector ($V_{PERP}$) perpendicular to the two surface contact point normals as illustrated by equation (1) below. In equation (1), $SCP_{1NORMAL}$ and $SCP_{2NORMAL}$ represent the surface contact point normals for the two virtual objects colliding with the haptic interface location.

$$V_{PERP} = SCP_{1NORMAL} \times SCP_{2NORMAL} \quad (1)$$

In step 106, the haptic rendering application determines the line which passes through the current SCP and which is parallel to the vector $V_{PERP}$. In step 108 the haptic rendering application projects the haptic interface location onto the line determined in step 106 in order to determine an updated SCP location. Finally in step 110, the haptic rendering application calculates a force to be applied to the user in real space in response to the updated SCP location determined in step 108.

Figure 6:
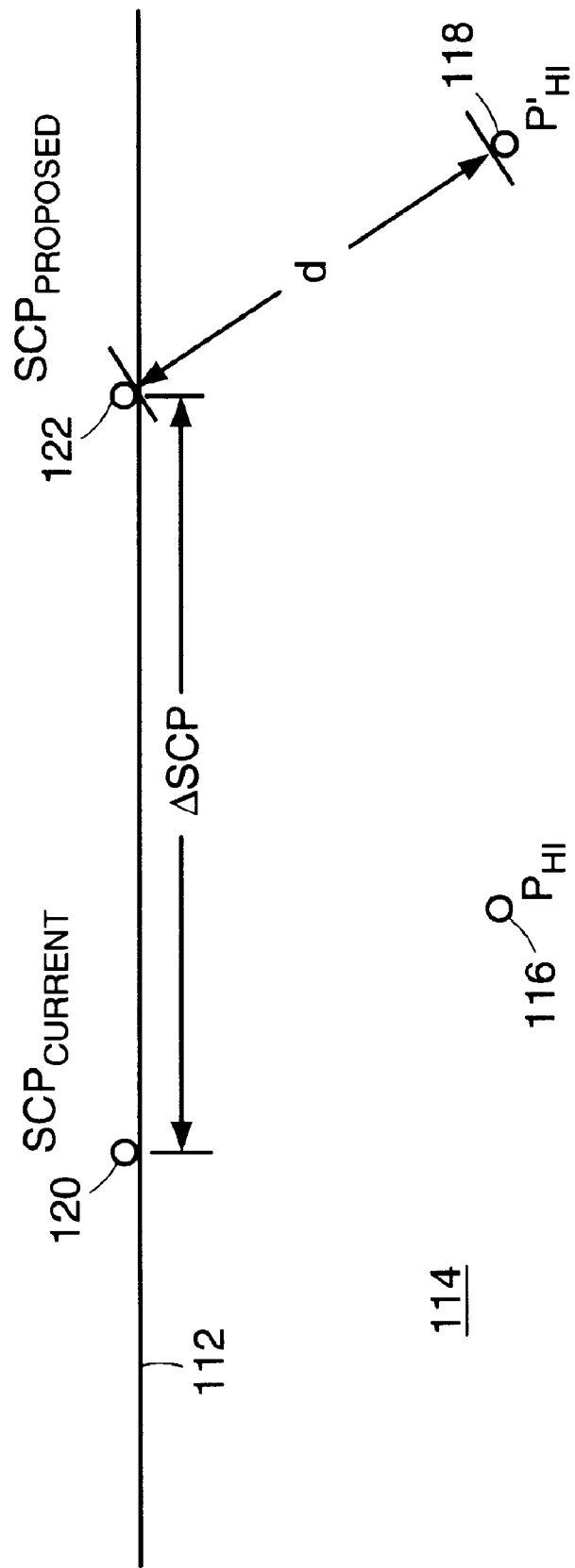
FIG. 6 is a pictorial view of a surface of a virtual object and a surface contact point located on the surface.
Figure 7:
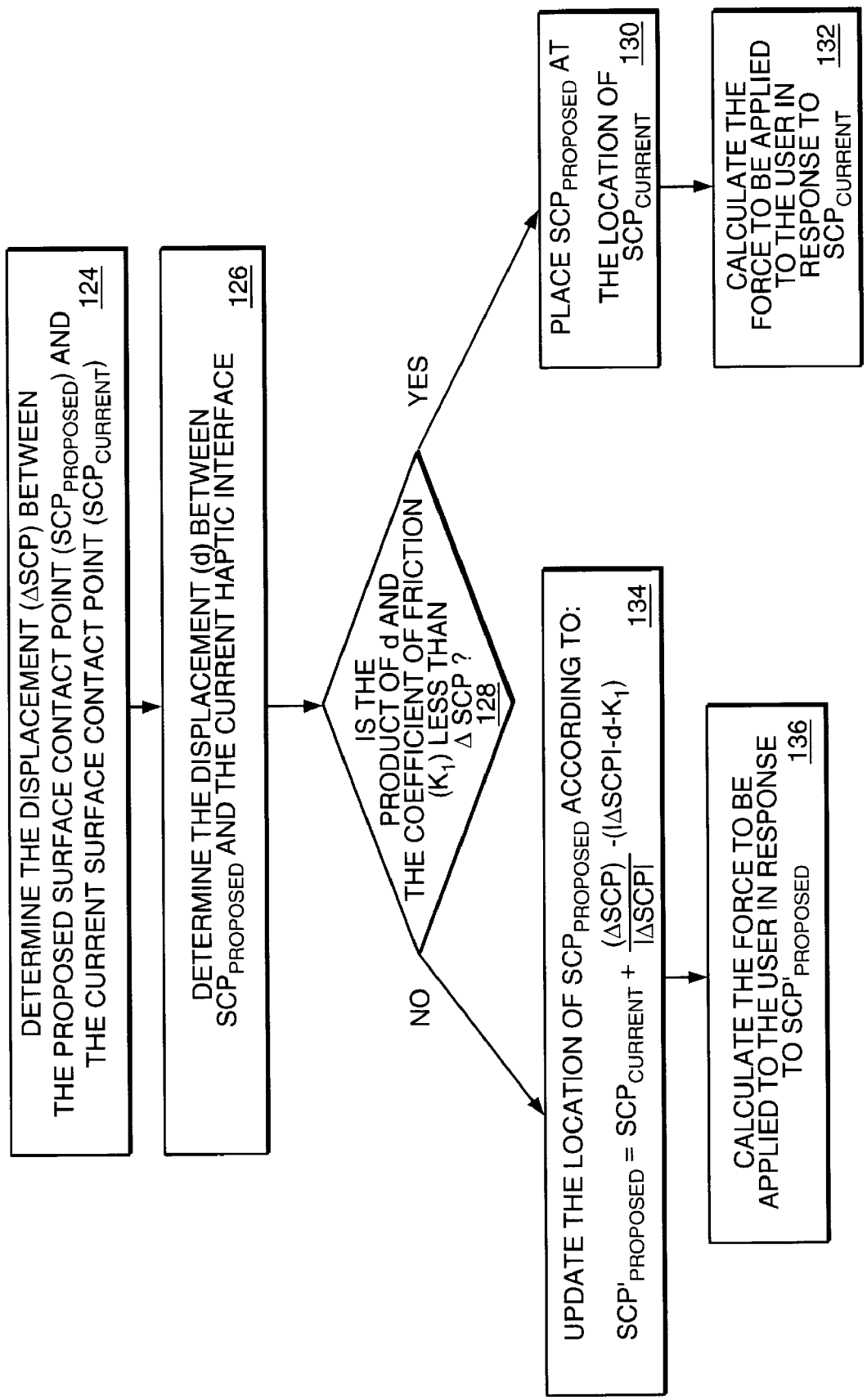
FIG. 7 is a flowchart representation of an embodiment of a process for determining a friction force to be applied to a user through a haptic interface.

FIGS. 6 and 7 illustrate the steps performed by one embodiment of a haptic rendering application to calculate a friction force to be applied to the user in real space. FIG. 6 shows a surface 112 of a portion of a virtual object 114. FIG. 6 shows the haptic interface point moving from a first haptic interface point location ($P_{HI}$) 116 to a second haptic interface point location ($P'_{HI}$) 1118. The point $SCP_{CURRENT}$ 120 represents the current location of the surface contact point. The haptic rendering application calculated the point $SCP_{CURRENT}$ 120 in response to the first haptic interface point location ($P_{HI}$) 116. The point $SCP_{PROPOSED}$ 122 represents the haptic rendering application's proposed new surface contact point. The haptic rendering application calculated the point $SCP_{PROPOSED}$ 122 in response to the change in location of the haptic interface point from $P_{HI}$ 116 to $P'_{HI}$ 118.

FIG. 7 shows a flowchart of the steps performed by one embodiment of the method of the present invention for determining the friction forces to be applied to a user in the real world through a haptic interface device. The method illustrated by the flowchart in FIG. 7 determines both the static and kinetic friction forces to be applied to the user in real space. The method calculates a static friction force to be applied to the user if the user has made contact with a virtual object, but has not provided enough tangential force to "break away" from the object. Once the user applies enough force to break away from the object, the haptic rendering application determines a kinetic friction force to be applied to the user. The kinetic friction force is applied in a direction to oppose the direction of motion of the user. All friction forces are applied to the user in directions tangential to the surface of the virtual object being contacted.

In step 124, the haptic rendering application determines the displacement ($\Delta SCP$) between the proposed surface contact point $SCP_{PROPOSED}$ 122 and the current surface contact point $SCP_{CURRENT}$ 120. Next, in step 126, the haptic rendering application determines the displacement (d) between the proposed surface contact point $SCP_{PROPOSED}$ 122 and the current haptic interface point $P'_{HI}$ 118. In step 128, the haptic rendering application multiplies the displacement d by a coefficient of friction ($k_f$) to determine a product. The haptic rendering application then determines if the product of the displacement d and the coefficient of friction $k_f$ is less than the displacement $\Delta SCP$ as illustrated by equation (2) below.

$$d \cdot k_f < \Delta SCP \quad (2)$$

If the product of the displacement d and the coefficient of friction $k_f$ is less than the displacement $\Delta SCP$, the haptic rendering application proceeds to step 130 and places the proposed surface contact point $SCP_{PROPOSED}$ 122 at the location of the current surface contact point $SCP_{CURRENT}$ 120. Next, in step 132, the haptic rendering application calculates a friction force to be applied to the user in response to the current surface contact point $SCP_{CURRENT}$ 120. In calculating the friction force, the haptic rendering application uses the coefficient of static friction associated with the location of the current surface contact point $SCP_{CURRENT}$ 120. If the product of the displacement d and the coefficient of friction $k_f$ is greater than or equal to the displacement $\Delta SCP$, the haptic rendering application proceeds to step 134 and updates the location of the proposed surface contact point $SCP_{PROPOSED}$ 122 to an new proposed surface contact point ($SCP'_{PROPOSED}$) according to equation (3) below.

$$(SCP')_{PROPOSED} = SCP_{CURRENT} + \frac{(\Delta SCP)}{|\Delta SCP|} \cdot (|\Delta SCP| - d \cdot k_f) \quad (3)$$

In equation (3), $SCP'_{PROPOSED}$ represents the updated location of the proposed surface contact point, $SCP_{CURRENT}$ represents the location of the current surface contact point, $\Delta SCP$ represents the displacement between $SCP_{CURRENT}$ 120 and the initial proposed surface contact point $SCP_{PROPOSED}$ 122, d represents the displacement between the current surface contact point $SCP_{CURRENT}$ 120 and the current haptic interface point $P'_{HI}$ 118, and $k_f$ represents the coefficient of kinetic friction.

Once the haptic rendering application has updated the location of the proposed surface contact point, in step 136 the haptic rendering application calculates a friction force to be applied to the user in response to the updated location. In calculating the friction force, the haptic rendering application uses the coefficient of kinetic friction associated with the location of the updated proposed current surface contact point $SCP'_{PROPOSED}$.

Figure 8:
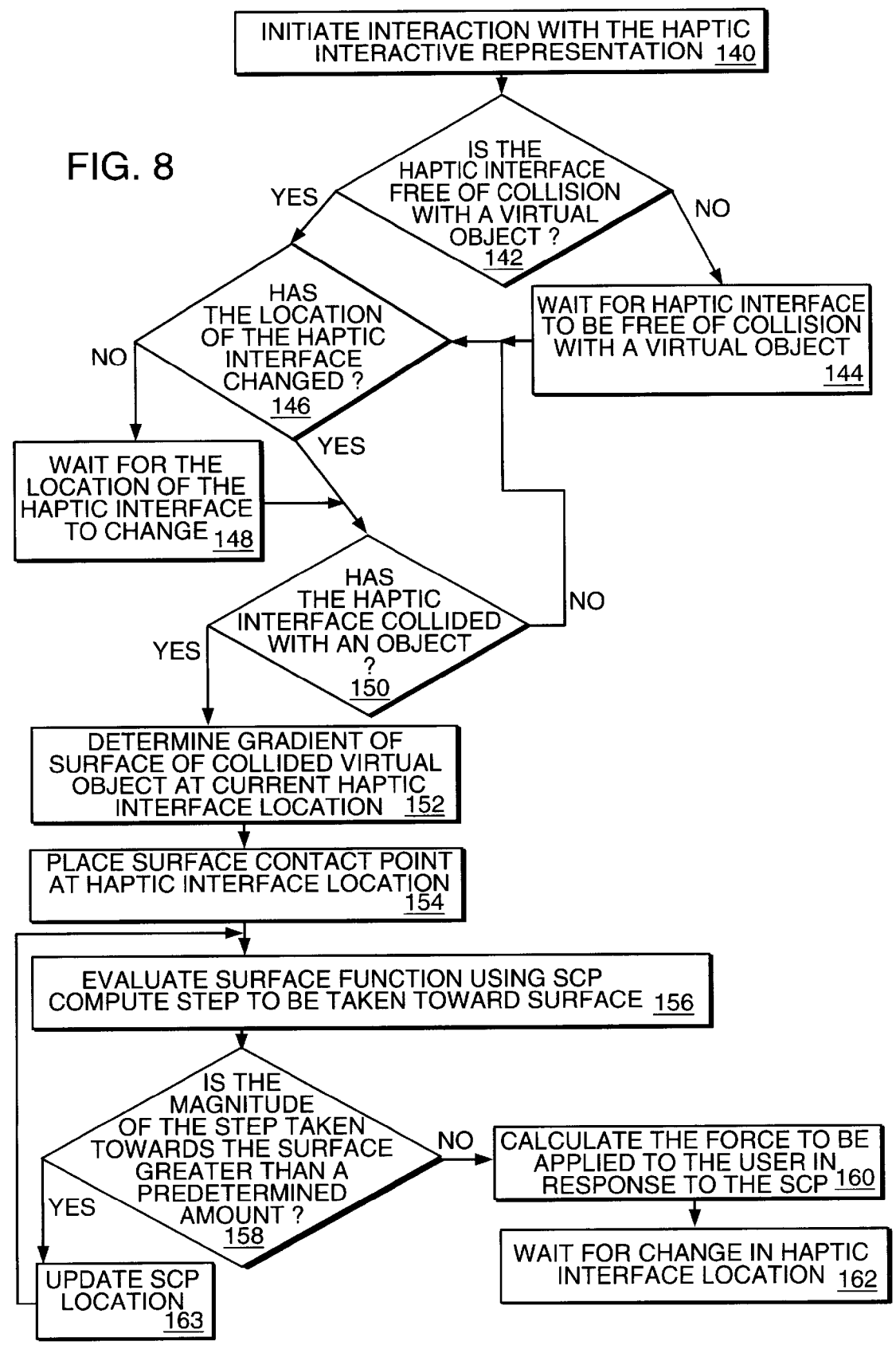
FIG. 8 is a flowchart representation of an embodiment of a process for determining the initial proposed surface contact points for algebraic objects contained in the haptic interactive representation.

FIG. 8 shows a flowchart illustrating the steps performed by one embodiment of the method of the present invention for determining the initial proposed surface contact points for algebraic objects contained within the haptic interactive representation. As discussed above, an algebraic object is an object that is defined by an algebraic equation. The proposed surface contact points calculated with the method illustrated in FIG. 8 are utilized in the methods outlined in the flowcharts in FIGS. 3, 4, 5 and 7. The method illustrated by the flowchart in FIG. 8 is used for the first collision of each algebraic object with the haptic interface. The method for determining the proposed surface contact point for an algebraic object once the object has collided with the haptic interface and a first surface contact point has been determined will be discussed in more detail below in the description of FIG. 9.

In step 140, the user initiates interaction with the haptic interactive representation. As described above, the sensors of the haptic interface system sense the position of the user in real space. The haptic rendering application utilizes the information obtained by the sensors to determine the user's haptic interface location in haptic interaction space. Once the haptic rendering application has determined the user's haptic interface, in step 142 the haptic rendering application determines if the haptic interface is free of collision with a virtual object. If the haptic interface collides with at least one virtual object, the haptic rendering application proceeds to step 144 and waits for the haptic interface to be free of collision with any virtual objects. In other words, before the haptic rendering application determines any proposed surface contact points, the haptic interface must be free of collision with any of the virtual objects in the haptic interactive representation. The position of the user in real space must change in order for the haptic interface to become free of collision with the virtual objects.

If the haptic interface is free of collision with any of the virtual objects upon the user initiating interaction with the haptic interactive representation, in step 146 the haptic rendering application determines if the location of the haptic interface has changed. If the location of the haptic interface has not changed, in step 148 the haptic rendering application waits for the location of the haptic interface to change. If the location of the haptic interface has changed, in step 150 the haptic rendering application determines if the haptic interface has collided with a virtual object. To determine if the haptic interface has collided with an object, the haptic rendering application evaluates the function (S(P)=0) defining the surface of algebraic object using the point defining the location of the haptic interface point. If the function S(P) is equal to zero at the location of the haptic interface, then the haptic interface is located directly on the surface of the algebraic object and the haptic interface is deemed to have collided with the object. If the function S(P) is less than zero at the location of the haptic interface, then the haptic interface is located within the surface of the object and the haptic interface is deemed to have collided with the algebraic object. If the function S(P) is greater than zero at the location of the haptic interface, then the haptic interface is located outside the algebraic object and the haptic interface is deemed not to have collided with the algebraic object. If the haptic interface has not collided with a virtual object, the haptic rendering application returns to step 146 and waits for the haptic interface to change its location again.

If the haptic interface has collided with at least one virtual object, in step 152 the haptic rendering application determines the gradient of the surface (S'(P)) of the collided object at the current haptic interface location. Next, in step 154, the haptic rendering application places the proposed surface contact point at the current haptic interface location. The object of the remaining next group of steps 156, 158 and 160 is to move the proposed surface contact point closer to the surface defined by S(P)=0. The method moves the proposed surface contact point in successive steps from the haptic interface location toward the surface in the direction of the gradient of the surface S'(P) until the size of the step taken toward the surface is less than a predetermined amount. To calculate the size of the step to be taken, in step 156 the haptic rendering application evaluates the surface function S(P) using the proposed surface contact point. The haptic rendering application then calculates the vector (dP) representing the step to be taken from the current proposed surface contact point toward the surface of the object according to equation (4) below.

$$dP = \frac{S(P) \cdot S'(P)}{S'(P) \cdot S'(P)} \quad (4)$$

In equation (4), S(P) represents the value of the surface function at the location of the current proposed surface contact point and S'(P) represents the gradient of the surface defined by the equation S(P). Once the haptic rendering application has determined the vector dP, it calculates the magnitude (|dP|) of the vector dP. Next, in step 158 the haptic rendering application determines if the magnitude |dP| of the step needed to be taken toward the surface of the algebraic object is greater than a predetermined step size. The predetermined step size indicates the proposed surface contact point is acceptably close to the virtual object.

If the magnitude |dP| of the step is not greater than the predetermined amount, then the haptic rendering application proceeds to step 160 and calculates the force to be applied to the user in response to the current proposed surface contact point. Next, in step 162, the haptic rendering application waits for a change in the location of the haptic interface to determine a new surface contact point. If the magnitude |dP| of the step is greater than the predetermined amount, the haptic rendering application proceeds to step 164 and updates the location of the current surface contact point to a new surface contact point $SCP_{NEW}$ according to equation (5) below.

$$SCP_{NEW} = SCP_{CURRENT} - dP \quad (5)$$

In equation (5), $SCP_{NEW}$ represents the vector pointing from the origin of the coordinate system defining the haptic interface space to the new proposed surface contact point, $SCP_{CURRENT}$ represents the vector pointing from the origin to the current proposed surface contact point and dP represents the step to be taken from the current surface contact point to the surface of the object.

After the location of the surface contact point has been updated, the haptic rendering application returns to step 156 and repeats steps 156, 158 and 164 until the magnitude of the step taken toward the surface of the object is less than the predetermined amount.

In another embodiment, in step 158, rather than determining whether the magnitude of the step taken towards the surface of the object is greater than a predetermined amount, the haptic rendering application determines if the result of evaluating the surface function equation S(P) in step 156 for the current surface contact point is less than a predetermined amount. Evaluating the surface function equation S(P) provides a result that is a measure of the distance of the proposed surface contact point to the surface of the algebraic object.

Figure 9:
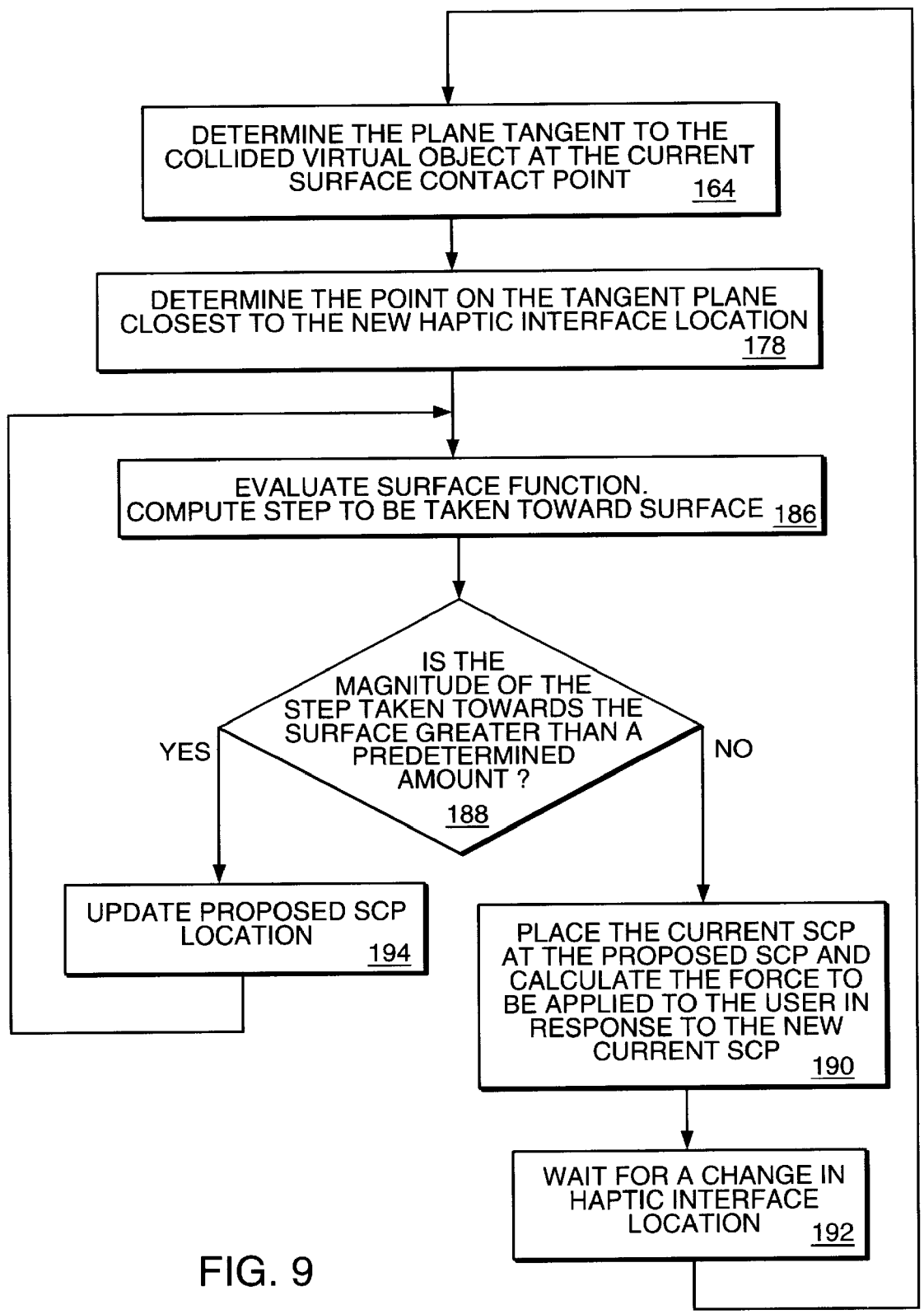
FIG. 9 is a flowchart representation of an embodiment of a process for determining proposed surface contact points for algebraic objects contained within the haptic interactive representation after initial contact with the virtual objects.

FIG. 9 shows a flowchart illustrating the steps performed by one embodiment of the method of the present invention for determining the proposed surface contact point for an algebraic object contained within the haptic interactive representation after the initial contact with the algebraic object has been made and a first proposed surface contact point has been calculated. The haptic rendering application executes the method of FIG. 9 after the haptic interface location changes in step 162 of FIG. 8.

Figure 9A:
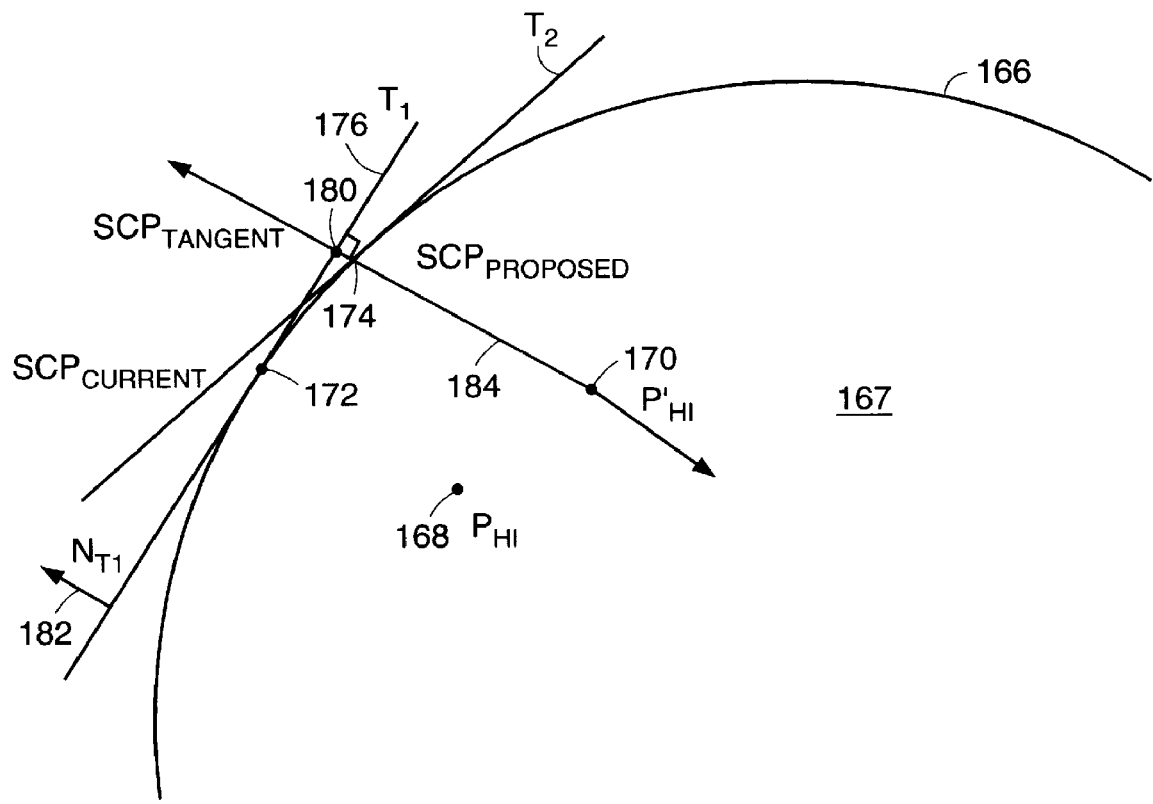
FIG. 9A is a pictorial view of an algebraic surface and a haptic interface point which has penetrated the algebraic surface.

FIG. 9A shows an example of an algebraic surface 166 of an object 167 defined by the function S(P) which has been generated by one embodiment of the present invention. FIG. 9A shows the haptic interface point moving from a current haptic interface point location ($P_{HI}$) 168 to a second haptic interface point location ($P'_{HI}$) 170. The point $SCP_{CURRENT}$ 172 represents the current location of the surface contact point as calculated by the haptic rendering application upon the user's first contact with the algebraic object 167. The haptic rendering application calculated the point $SCP_{CURRENT}$ 172 in response to the first haptic interface point location ($P_{HI}$) 168. The point $SCP_{PROPOSED}$ 174 represents the haptic rendering application's proposed new surface contact point. The haptic rendering application calculated the point $SCP_{PROPOSED}$ 174 in response to the change in location of the haptic interface point from $P_{HI}$ 168 to $P'_{HI}$ 170.

In step 164, the haptic rendering application determines the plane ($T_1$) 176 tangent to the collided virtual object 167 at the current surface contact point location $SCP_{CURRENT}$ 172. Next in step 178, the haptic rendering application determines the point ($SCP_{TANGENT}$) 180 on the tangent plane $T_1$ 176 that is closest to the new haptic interface location $P'_{HI}$ 170. The tangent plane $T_1$ 176 is defined by $N_{T1}$ 182, a vector normal to the plane $T_1$ 176 and $d_{T1}$, a scalar distance from the origin of the coordinate system defining the haptic interaction space. To compute the location of $SCP_{TANGENT}$ 180, the haptic rendering application determines the line 184 parallel to $N_{T1}$ 182 which passes through the point $P'_{HI}$ 170. The haptic rendering application then determines the point of intersection 180 of the line 184 with the plane $T_1$ 176. The point of intersection is the point $SCP_{TANGENT}$ 180. The haptic rendering application uses equation (6) below to calculate the location of $SCP_{TANGENT}$ 180.

$$SCP_{TANGENT} = P'HI + (d_{T1} - P'_{HI} N_{T1}) N_{T1} \qquad (6)$$

In equation (6), $SCP_{TANGENT}$ represents the vector pointing from the origin of the coordinate system to the point $SCP_{TANGENT}$ 180. $SCP_{TANGENT}$ 180 is now the new proposed surface contact point location.

Next, the haptic rendering application determines the point $SCP_{PROPOSED}$ 174 on the surface 166 of the virtual object 167. To iteratively move the point $SCP_{TANGENT}$ 180 toward the surface, in step 186 the haptic rendering application evaluates the surface function S(P) defining the surface 166 using the point $SCP_{TANGENT}$ 180. In step 188, the haptic rendering application determines if the step taken from $SCP_{TANGENT}$ 180 to the surface 166 is greater than a predetermined amount. If the step to be taken toward the surface is not greater than a predetermined amount, in step 190, the haptic rendering application places the current surface contact point at the current proposed surface contact point and calculates the force to be applied to the user in real space in response to the new current surface contact point. Next, in step 192, the haptic rendering application waits for the haptic interface location to change. Once the haptic interface location changes, the haptic rendering application returns to step 164 and repeats the process to calculate the next surface contact point location.

If the magnitude of the step to be taken toward the surface is greater than a predetermined amount, the haptic rendering application proceeds to step 194 and updates the proposed surface contact point location. In one embodiment, the haptic rendering application uses a method similar to the method described above in steps 156, 158 and 164 of FIG. 8 to iteratively move the point $SCP_{TANGENT}$ 180 closer to the point $SCP_{PROPOSED}$ 174.

Figure 10A:
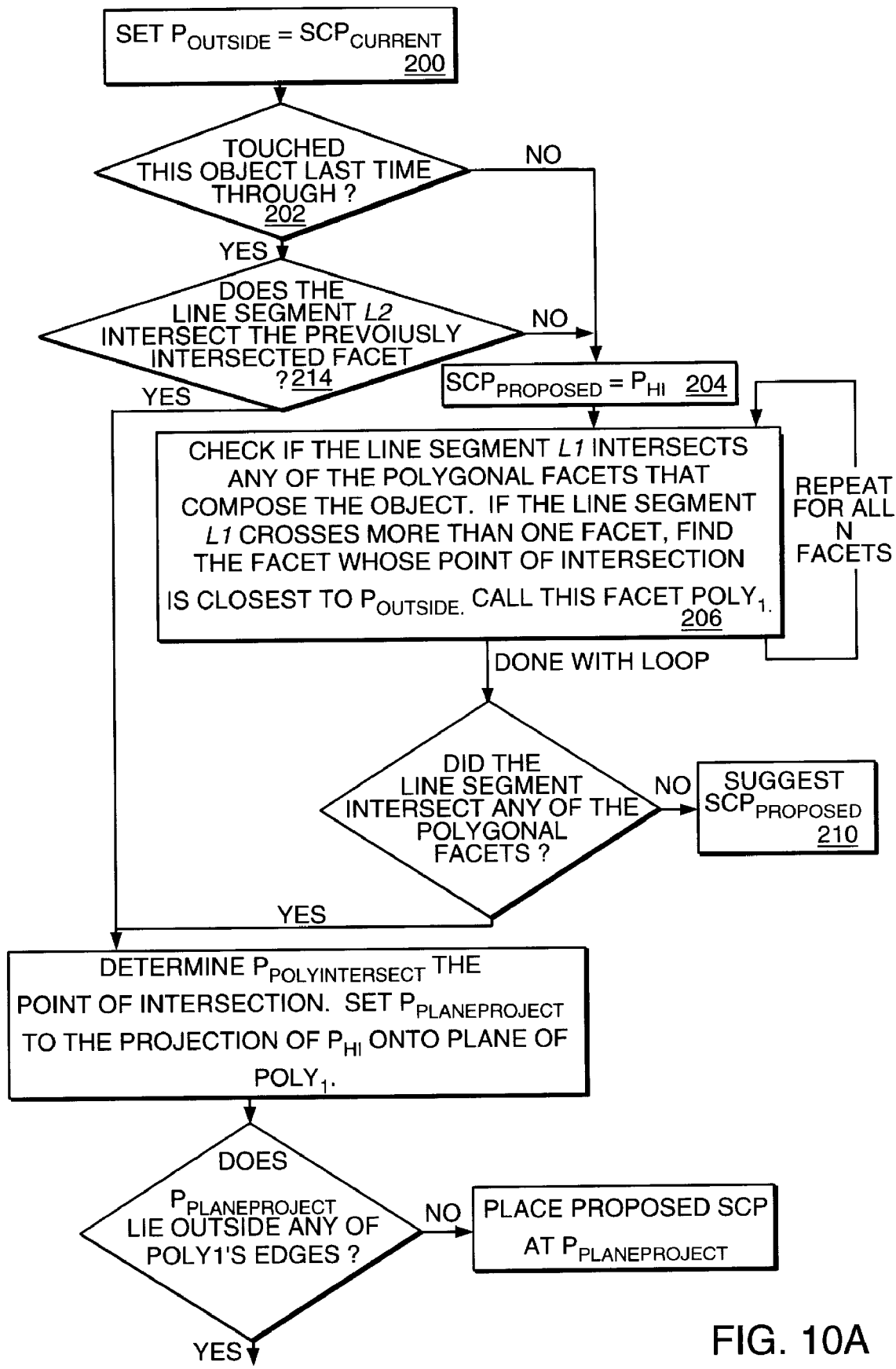
FIG. 10A is a flowchart representation of an embodiment of a process for determining proposed surface contact points for polygonal objects contained within the haptic interactive representation.

FIG. 10A shows a flowchart illustrating the steps performed by one embodiment of the method of the present invention for determining a proposed surface contact point for a polygonal object contained within the haptic interactive representation. As discussed above, a polygonal object is an object created by linking polygons. Similar to the method for calculating the initial proposed surface contact point for algebraic objects, after the user initiates interaction with the haptic interactive representation, the haptic rendering application waits for the haptic interface to be free of collision with any virtual object. Once the haptic interface is free of collision with any virtual object, the haptic rendering application then waits for the haptic interface to collide with a virtual object. In one embodiment, to determine if the haptic interface point collides with a virtual polygonal object, the haptic rendering application determines a line intersecting the current haptic interface location and the previous haptic interface location. If this line intersects any facets of a polygonal object, then the haptic interface has collided with that object.

In step 200, the haptic rendering application sets the current surface contact point ($SCP_{CURRENT}$) equal to the last haptic interface point ($P_{OUTSIDE}$) not located within the polygonal object. Next, in step 202 the haptic rendering application determines whether the currently collided object collided with the haptic interface location during the previous iteration. If the virtual object did not collide with the haptic interface locator during the previous iteration, then the haptic rendering application proceeds to step 204 and sets the proposed surface contact point ($SCP_{PROPOSED}$) equal to the current haptic interface location ($P_{HI}$). Next, in step 206 the haptic rendering application determines the line segment L1 connecting $P_{OUTSIDE}$ and $SCP_{PROPOSED}$. The haptic rendering application then determines if the line segment L1 intersects any of the polygonal facets that compose the collided polygonal object. If the line segment L1 intersects more than one facet, the haptic rendering application determines the facet ($Poly_1$) that has a point of intersection that is closest to $SCP_{CURRENT}$. The haptic rendering application repeats step 206 for all of the facets of the collided polygonal object.

Once the haptic rendering application has completed step 206 for all of the facets of the collided polygonal object, it proceeds to step 208 and determines if the line segment L1 intersected any of the polygonal object's facets in step 206. If the line segment L1 did not intersect any of the polygonal facets in step 206, the polygonal object is not colliding with the haptic interface. In step 210 the haptic rendering uses the proposed surface contact point $SCP_{PROPOSED}$ as the proposed surface contact point for that virtual object. If the line segment L1 did intersect at least one of the polygonal facets in step 206, the polygonal object is colliding with the haptic interface and the haptic rendering application proceeds to step 212 which will be discussed in more detail below.

If in step 202 the haptic rendering application determines that the currently collided object collided with the haptic interface location during the previous iteration, the haptic rendering application proceeds to step 214. In step 214, the haptic rendering application determines a line segment L2 connecting the current surface contact point $SCP_{CURRENT}$ to the current haptic interface point $P_{HI}$. Then the haptic rendering application determines if the line segment L2 intersects the previously intersected facet ($POLY_1$). If the line segment L2 does not intersect the previously intersected facet of the polygonal object, then the haptic rendering application proceeds to step 204 discussed above. If the line segment L2 intersects the previously intersected facet $POLY_1$, then the haptic rendering application proceeds to step 212. In step 212, the haptic rendering application determines the point ($P_{POLYINTERSECT}$) at which the line segment L2 intersects the polygonal object's facet $POLY_1$. Next, the haptic rendering application projects the current haptic interface point $P_{HI}$ onto the plane containing the facet $POLY_1$. The projected point is referred to herein as $P_{PLANEPROJECT}$.

Next, in step 216, the haptic rendering application determines if the point $P_{PLANEPROJECT}$ lies outside of any of the edges of facet $POLY_1$. To determine if the point $P_{PLANEPROJECT}$ lies outside any of the edges of facet $POLY_1$, the haptic rendering application determines a line segment L3 which connects the point $P_{POLYINTERSECT}$ to the point $P_{PLANEPROJECT}$. If the line segment L3 does not cross any of the edges of $POLY_1$ then the point $P_{PLANEPROJECT}$ lies within the facet $POLY_1$. If the point $P_{PLANEPROJECT}$ lies entirely within the boundaries of the facet $POLY_1$, the haptic rendering application proceeds to step 218 and places the new proposed surface contact point at the point $P_{PLANEPROJECT}$. In another embodiment, the haptic rendering application places the new proposed surface contact point at a location slightly above the surface of the facet $POLY_1$. The haptic rendering application calculates the point slightly above the facet $POLY_1$ according to equation (7) below in which ε represents a predetermined distance from the surface of the polygonal object, $SCP_{PROPOSED}$ represents the vector pointing from the origin of the coordinate system defining the haptic interaction space to the proposed surface contact point, $P_{PLANEPROJECT}$ represents the vector pointing from the origin to point $P_{PLANEPROJECT}$, and $POLY_{1NORMAL}$ represents the unit vector normal to the facet $POLY_1$.

$$SCP_{PROPOSED} = P_{PLANEPROJECT} + \epsilon \cdot POLY_{1NORMAL} \qquad (7)$$

The value of $\epsilon$ is determined by how far above the surface the proposed surface contact point should be located.

Figure 10B:
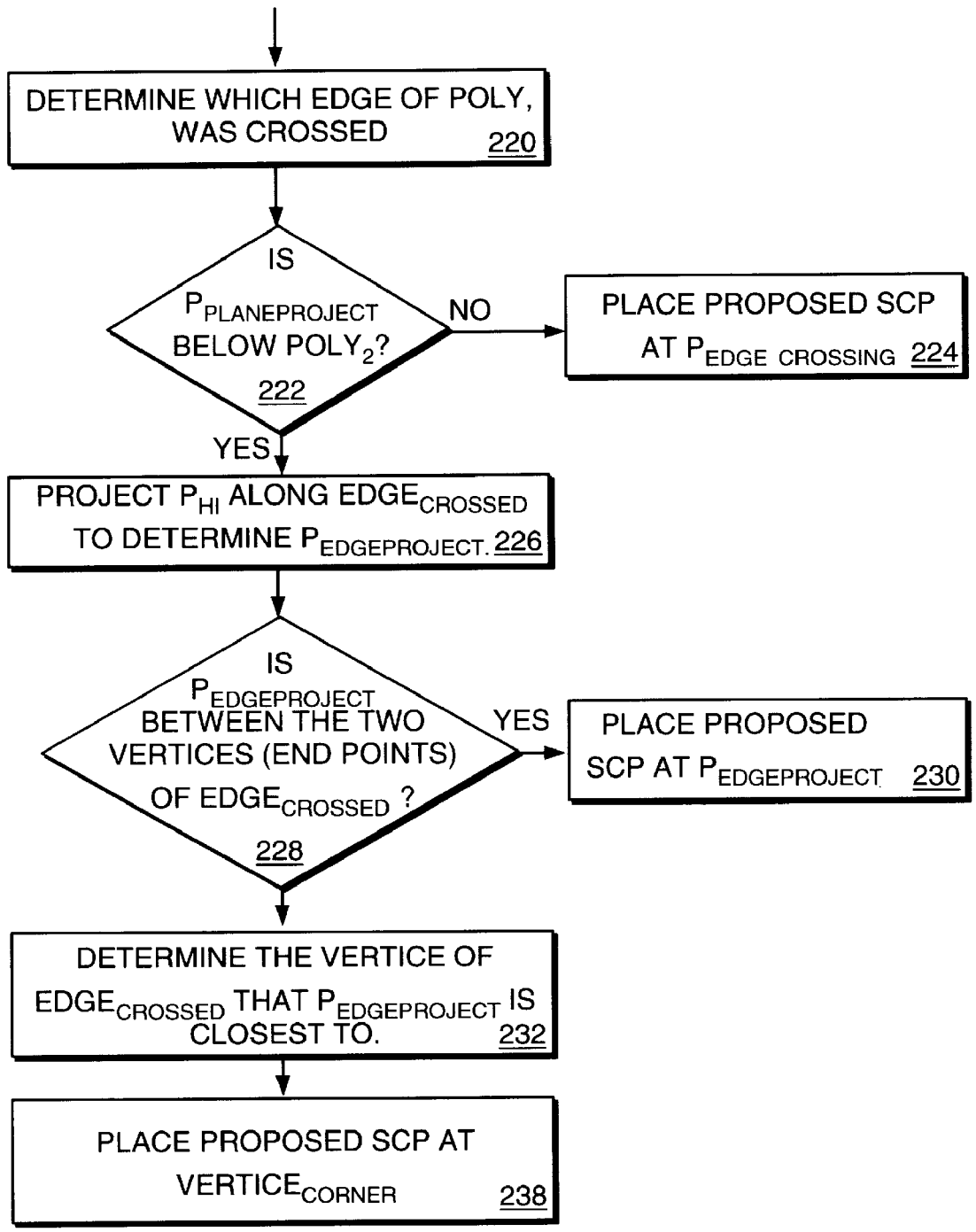
FIG. 10B is a flowchart representation of an embodiment of a process for determining a proposed surface contact point for a polygonal object when the haptic interface is not located solely within one facet of the polygonal object.

If the point $P_{PLANEPROJECT}$ lies outside one of the boundaries of the facet $POLY_1$, the haptic rendering application proceeds to step 220 in FIG. 10B. FIG. 10B shows a flowchart illustrating the steps performed by one embodiment of the method of the present invention for determining a proposed surface contact point for a polygonal object when the haptic interface is not located solely within one facet of the polygonal object. In step 220, the haptic rendering application determines which edge ($EDGE_{CROSSED}$) of $POLY_1$ was crossed and the facets of the polygonal object which share $EDGE_{CROSSED}$. The haptic rendering application also determines which of the facets sharing $EDGE_{CROSSED}$ are intersected by the line segment L3, which connects the point $P_{POLYINTERSECT}$ to the point $P_{PLANEPROJECT}$. The haptic rendering application then selects one of the facets (POLY2) which shares $EDGE_{CROSSED}$. Next, in step 222 the haptic rendering application determines if the point $P_{PLANEPROJECT}$ is below the facet POLY2. The haptic rendering application evaluates the equation defining the plane containing the facet POLY2 using the point $P_{PLANEPROJECT}$. If the result of the equation is greater than zero, the point $P_{PLANEPROJECT}$ is above the facet POLY2. If the result of the equation is less than zero the point $P_{PLANEPROJECT}$ is below the facet POLY2. If the point $P_{PLANEPROJECT}$ is above the facet POLY2, then the point $P_{PLANEPROJECT}$ is located outside the surface of the virtual polygonal object and the haptic rendering application proceeds to step 224. In step 224, the haptic rendering application determines the point ($P_{EDGECROSSING}$) where the line segment L3 intersects the edge $EDGE_{CROSSED}$ and places the proposed surface contact point at the point $P_{EDGECROSSING}$.

In another embodiment, the haptic rendering application places the new proposed surface contact point at a location slightly above and to the side of the edge $EDGE_{CROSSED}$. The haptic rendering application calculates the point slightly above and to the side of the edge $EDGE_{CROSSED}$ according to equation (8) below in which $\epsilon$ represents a predetermined distance from the surface of the polygonal object, $P_{JUST-BEYOND-EDGE}$ represents the vector pointing from the origin of the coordinate system defining the haptic interaction space to the new proposed surface contact point, $P_{EDGECROSSING}$ represents the vector pointing from the origin to point $P_{EDGECROSSING}$, $EDGE_{CROSSED}$ represents the vector along the edge $EDGE_{CROSSED}$, and $POLY_{1NORMAL}$ represents the unit vector normal to the facet $POLY_1$.

$$P_{JUSTBEYONDEDGE} = P_{EDGECROSSING} + \epsilon \cdot POLY_{1NORMAL} + 2 \cdot \epsilon (POLY_{1NORMAL} \times EDGE_{CROSSED}) \qquad (8)$$

If the point $P_{PLANEPROJECT}$ is below the facet POLY2, then the point $P_{PLANEPROJECT}$ is located within the surface of the virtual polygonal object and the haptic rendering application proceeds to step 226. In step 226, the haptic rendering application projects the haptic interface point $P_{HI}$ along the edge $EDGE_{CROSSED}$ to determine a point $P_{EDGEPROJECT}$. In step 228, the haptic rendering application determines if the point $P_{EDGEPROJECT}$ is between the two vertices (end points) of the edge $EDGE_{CROSSED}$. If the point $P_{EDGEPROJECT}$ is between the two vertices, then the haptic rendering application proceeds to step 230 and places the new proposed surface contact point at $P_{EDGEPROJECT}$. In another embodiment, the haptic rendering application places the new proposed surface contact point at a location slightly above the edge $EDGE_{CROSSED}$ and inside the facet $POLY_1$. The haptic rendering application calculates the point slightly above the edge $EDGE_{CROSSED}$ according to equations (9) and (10) below in which $\epsilon$ represents a predetermined distance from the surface of the polygonal object, $SCP_{PROPOSED}$ represents the vector pointing from the origin of the coordinate system defining the haptic interaction space to the new proposed surface contact point, $P_{EDGEPROJECT}$ represents the vector pointing from the origin to point $P_{EDGEPROJECT}$, $POLY_{1NORMAL}$ represents the unit vector normal to the facet POLY1, and $POLY_{2NORMAL}$ represents the unit vector normal to the facet $POLY_2$.

$$SCP_{NORMAL} = \text{normalize}(POLY_{1NORMAL} + POLY_{2NORMAL}) \qquad (9)$$

$$SCP_{PROPOSED} = P_{EDGEPROJECT} + \epsilon \cdot SCP_{NORMAL} \qquad (10)$$

If the point $P_{EDGEPROJECT}$ is not between the two vertices, then the haptic rendering application proceeds to step 232 and determines the vertice ($VERTICE_{CORNER}$) of the edge $EDGE_{CROSSED}$ that $P_{EDGEPROJECT}$ is closest to. Next, in step 238, the haptic rendering application places the proposed surface contact point at the point $VERTICE_{CORNER}$.

In another embodiment, the haptic rendering application does not place the proposed surface contact point at the point $VERTICE_{CORNER}$. Instead, the haptic rendering application determines whether the point $P_{EDGEPROJECT}$ is behind any of the other facets of the polygonal object other than POLY1 and POLY2 that meet at the vertice $VERTICE_{CORNER}$. If the point is not behind any other facets, the haptic rendering application places the new proposed surface contact point at a point ($P_{JUSTBEYONDVERTICE}$) slightly above the point $VERTICE_{CORNER}$. The haptic rendering application calculates the point slightly above the point $VERTICE_{CORNER}$ according to equation (1) below in which $\epsilon$ represents a predetermined distance from the surface of the polygonal object, $P_{JUSTBEYONDVERTICE}$ represents the vector pointing from the origin of the coordinate system defining the haptic interaction space to the new proposed surface contact point, $P_{EDGEPROJECT}$ represents the vector pointing from the origin to point $P_{EDGEPROJECT}$, $VERTICE_{CORNER}$ represents the vector normal to the surface at the point $VERTICE_{CORNER}$, $POLY_{1NORMAL}$ represents the unit vector normal to the facet POLY1, and $POLY_{2NORMAL}$ represents the unit vector normal to the facet $POLY_2$.

$$P_{JUSTBEYONDVERTICE} = \qquad (11)$$
$$VERTICE_{CORNER} + \varepsilon \cdot \text{normalize}(POLY_{1NORMAL} + POLY_{2NORMAL}) + 2\varepsilon \cdot \text{normaize}(P_{EDGEPROJECT} - VERTICE_{CORNER})$$

If the point is behind another facet, it is located within a corner and the haptic rendering application places the new proposed surface contact point at a point slightly above the point $VERTICE_{CORNER}$. However, in this case, the haptic rendering application calculates the point slightly above the point $VERTICE_{CORNER}$ according to equation (12) below in which $\epsilon$ represents a predetermined distance from the surface of the polygonal object, $P_{SCP}$ represents the vector pointing from the origin of the coordinate system defining the haptic interaction space to the new proposed surface contact point, $VERTICE_{CORNER}$ represents the vector normal to the surface at the point $VERTICE_{CORNER}$, and $SCP_{aNORMAL}$ represents the average normal of the surface normals of all the facets sharing $VERTICE_{CORNER}$.

$$P_{SCP} = VERTICE_{CORNER} + \epsilon \cdot SCP_{aNORMAL} \tag{12}$$

Figure 11:
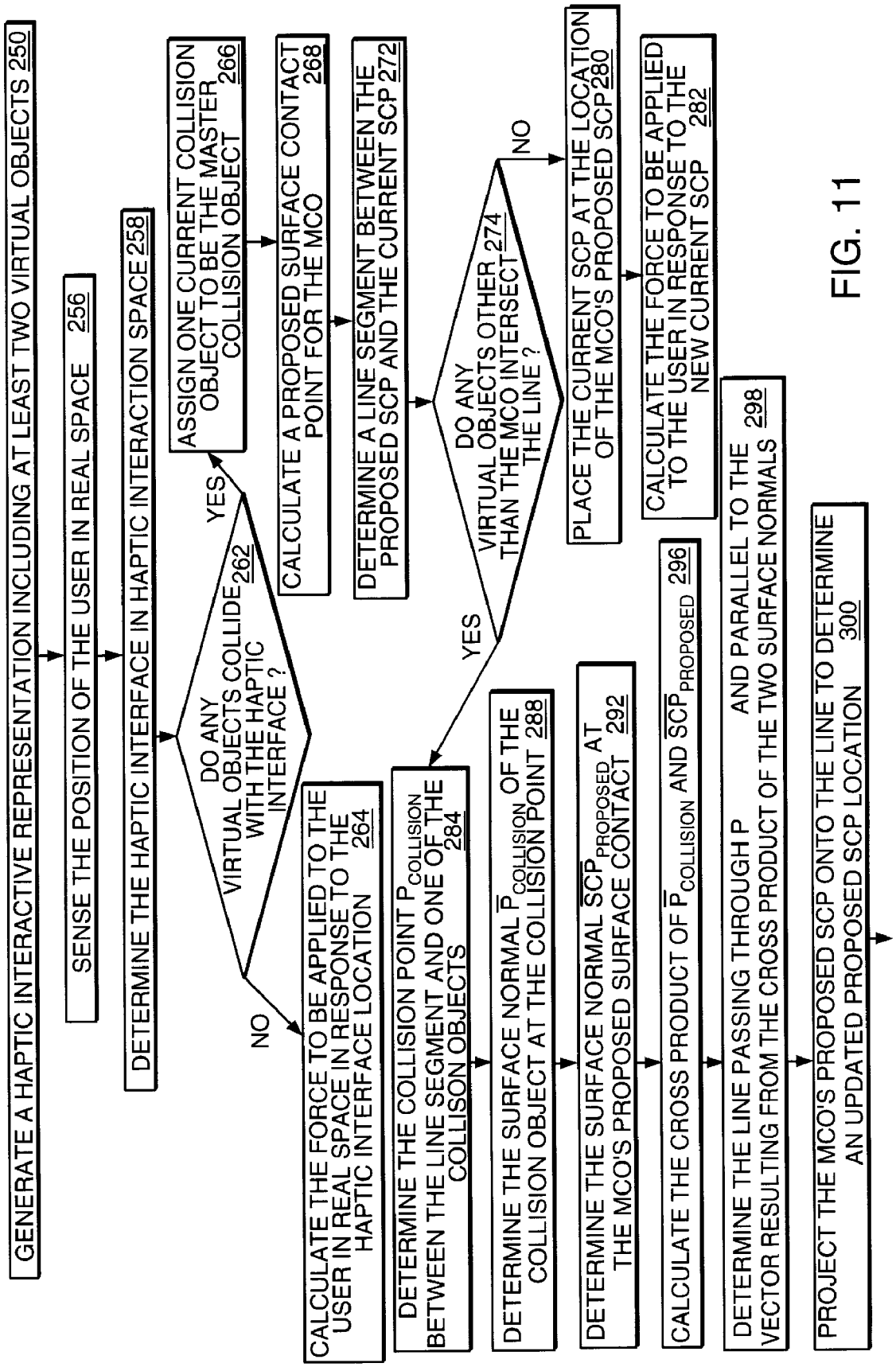
FIG. 11 is a flowchart representation of another embodiment of a process for determining a feedback force to be applied to a user through a haptic interface.

FIG. 11 shows a flowchart illustrating the steps performed by another embodiment of the method of the present invention for determining the forces to be applied to a user through a haptic interface device. In the embodiment illustrated by the flowchart of FIG. 11, the user's interactions with the haptic interactive representation are reduced to those of a point interacting with three dimensional objects in a three dimensional virtual environment. In other embodiments, the user's interactions are not reduced to those of a point interacting with three dimensional virtual objects. In other embodiments, the haptic interface may be a set of points. In still other embodiments, the haptic interface may be a three-dimensional object.

Figure 12A:
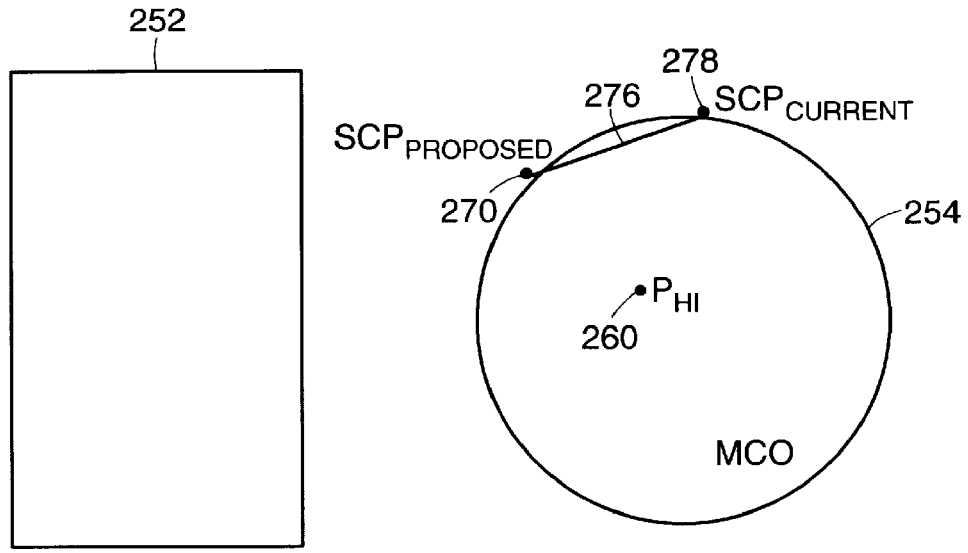
FIG. 12A is a pictorial view of a virtual object colliding with a haptic interface.
Figure 12B:
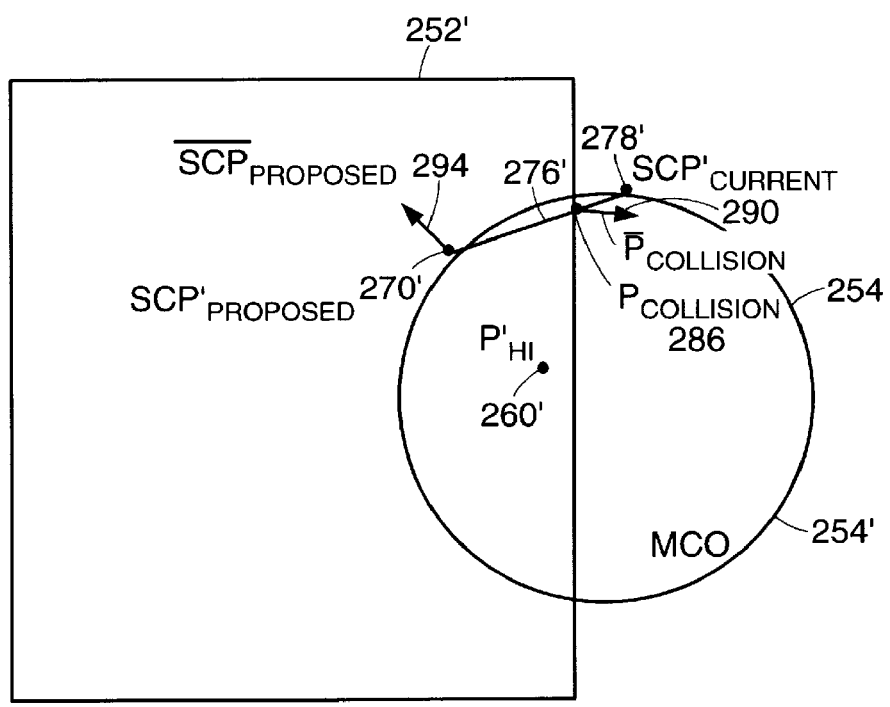
FIG. 12B is a pictorial view of two virtual objects colliding with a haptic interface.

In step 250, the haptic rendering application generates a haptic interactive representation which includes at least two representations of virtual objects. FIG. 12A shows an example of a haptic interactive representation created by one embodiment of the present invention which contains two virtual objects 252, 254 which do not overlap. FIG. 12B shows an example of a haptic interactive representation created by one embodiment of the present invention which contains two virtual objects 252', 254' which overlap. Once the haptic rendering application has generated a haptic interactive representation which includes at least two virtual objects, in step 256 the haptic interface device senses the position of the user in real space. In step 258, the haptic rendering application uses the position of the user in real space to determine the location of the haptic interface in the haptic interaction space. In FIGS. 12A and 12B the points PHI 260 and P'HI 260' represent the user's haptic interface point in the haptic interaction space. When the user changes position, the haptic interface device senses this change in position and the haptic rendering application updates the location of the haptic interface in haptic interaction space to reflect the change of the user's position in real space.

Once the haptic rendering application determines the location of the haptic interface, in step 262 it determines whether any of the virtual objects collide with the haptic interface location. A method for determining whether a virtual object collides with the haptic interface location will be discussed in more detail below. If no virtual objects collide with the haptic interface, in step 264 the haptic rendering application calculates the force to be applied to the user in real space based on the location of the haptic interface. If at least one of the virtual objects collides with the haptic interface location, the haptic rendering application proceeds to step 266. The objects which collide with the haptic interface are termed current collision objects. In FIG. 12A, object 254 is a current collision object and in FIG. 12B, objects 252' and 254' are current collision objects.

In step 266, the haptic rendering application assigns one of the current collision objects to be the master collision object (MCO). In FIG. 12A, the object 254 is the MCO because there is only one current collision object. In FIG. 12B, the haptic rendering application assigned the object 254' to be the MCO. Next, in step 268, the haptic rendering application calculates a proposed surface contact point for the MCO. In FIG. 12A, the point $SCP_{PROPOSED}$ 270 represents the proposed surface contact point for the MCO 254 and in FIG. 12B, the point $SCP'_{PROPOSED}$ 270' represents the proposed surface contact point for the MCO 254'. Once the haptic rendering application has determined a proposed surface contact point for the MCO, in step 272 it determines a line segment between the proposed surface contact point and the current surface contact point. In step 274, the haptic rendering application determines if any virtual objects in the haptic interaction space other than the MCO intersect this line segment. For example, in FIG. 12A, the haptic rendering application determines the line 276 which intersects the point $SCP_{PROPOSED}$ 270 and the current surface contact point $SCP_{CURRENT}$ 278. Since no objects other than the MCO 254 intersect the line segment 276, the haptic rendering application proceeds to step 280 and places the current surface contact point at the location of the MCO's proposed surface contact point, $SCP_{PROPOSED}$ 270. Next, in step 282 the haptic rendering application calculates the force to be applied to the user in real space in response to the new current surface contact point.

Figure 11A:
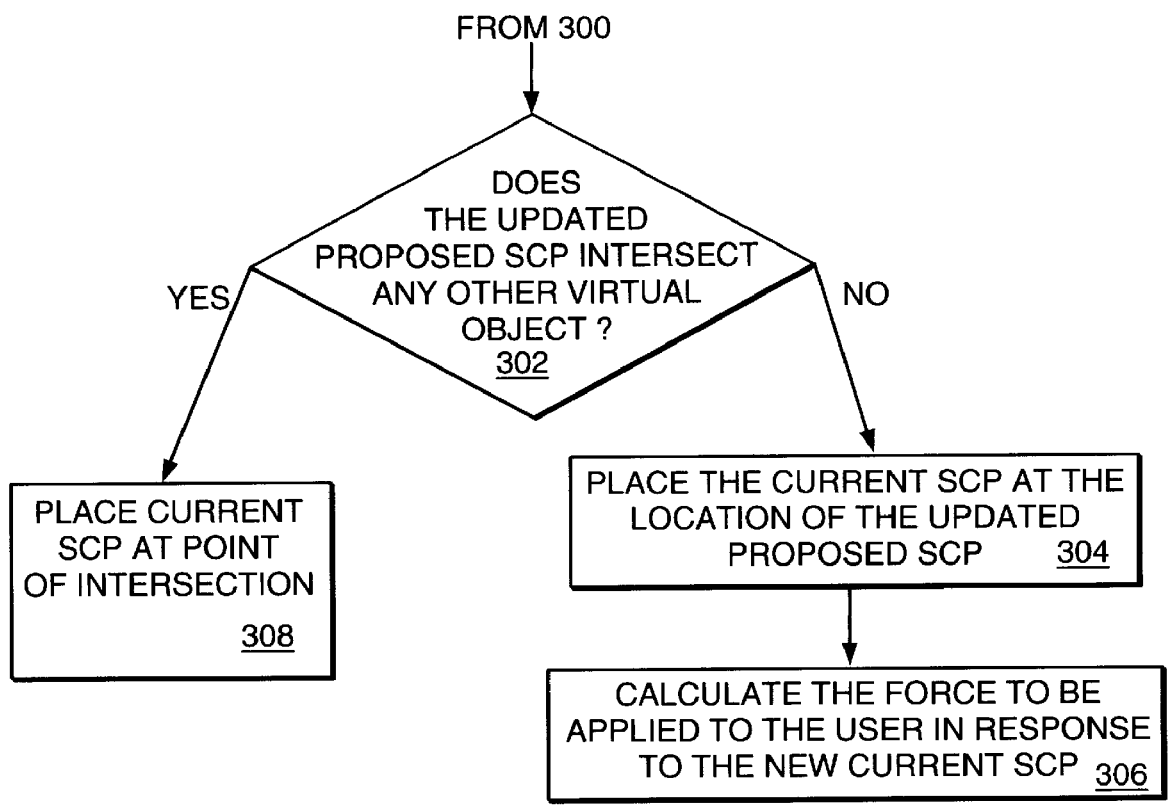
FIG. 11A is a flowchart representation continuing the steps of the process of FIG. 11.

If another virtual object intersect the line segment between the MCO's proposed surface contact point and the current surface contact point, the haptic rendering application proceeds to step 284. For example, in FIG. 12B the line segment 276' between the points $SCP'_{PROPOSED}$ 270' and $SCP'_{CURRENT}$ 278' intersects the virtual object 252'. In step 284, the haptic rendering applicant determines the collision point ($P_{COLLISION}$) 286 between the line segment 276' and the collision object 252'. Next, in step 288 the haptic rendering application determines the surface normal $\overline{P}_{COLLISION}$ 290 of the collision object 252' at the collision point $P_{COLLISION}$ 286. In step 292 the haptic rendering application determines the surface normal $\overline{SCP}_{PROPOSED}$ 294 at the MCO's proposed surface contact point $SCP'_{PROPOSED}$ 270'. Next, in step 296 the haptic rendering application calculates the cross products of the vectors $\overline{P}_{COLLISION}$ 290 and $\overline{SCP}_{PROPOSED}$ 294. Next, in step 298 the haptic rendering application determines the line passing through the point $P_{COLLISION}$ 286 and parallel to the vector resulting from the cross product of the vectors $\overline{P}_{COLLISION}$ 290 and $\overline{SCP}_{PROPOSED}$ 294. Next in step 300, the haptic rendering application projects the MCO's proposed surface contact point $SCP'_{PROPOSED}$ 270' onto the line determined in step 298 to determine an updated proposed surface contact point location ($SCP''_{PROPOSED}$). After the haptic rendering application has determined the updated proposed surface contact point $SCP''_{PROPOSED}$, it proceeds to step 302 in FIG. 11A.

In step 302, the haptic rendering application determines if the updated proposed surface contact point $SCP''_{PROPOSED}$, collides with any other virtual objects, other than the objects 252' and 254'. If the point $SCP''_{PROPOSED}$ does not collide with any other virtual objects, the haptic rendering application proceeds to step 304 and places the current surface contact point at the location of the updated proposed surface contact point $SCP''_{PROPOSED}$. Finally in step 306 the haptic rendering application calculates the force to be applied to the user in real space in response to the new current surface contact point.

If the point $SCP''_{PROPOSED}$ does collide with any other virtual objects, the haptic rendering application proceeds to step 308 and places the current surface contact point at the intersection.

The computational independence of the haptic space from the other spaces, such as graphics space and acoustic space which make up and interact with the virtual environment permits the computational manipulation of each of the spaces to occur at a rate which is optimal for the particular space. For example, although a user's haptic interaction with the virtual environment may be sampled, processed and fed back to the user at a rate of 1000 times per second, the graphics display depicting the interaction needs to be refreshed only at a rate of fifty times per second. Therefore only one in every twenty samples of what is occurring in haptic space need be depicted in graphics space. Similarly, the communication between, for example, haptic processes over a network also occurs at a rate slower than the rate at which the haptic space is updated. Therefore, a mechanism to permit the synchronization of processes executing at different rates is used to make use of the computational independence of the various processes manipulating and interacting with a virtual environment.

Other advantages of computational independence include the use of different representations for haptic and graphic rendering—such that representations best suited to each particular modality, for a given application, may be used. In addition, the use of dissimilar representations for the graphics and haptics processes, allows completely artificial worlds to be created where haptic and graphical stimuli do not correspond.

Figure 13:
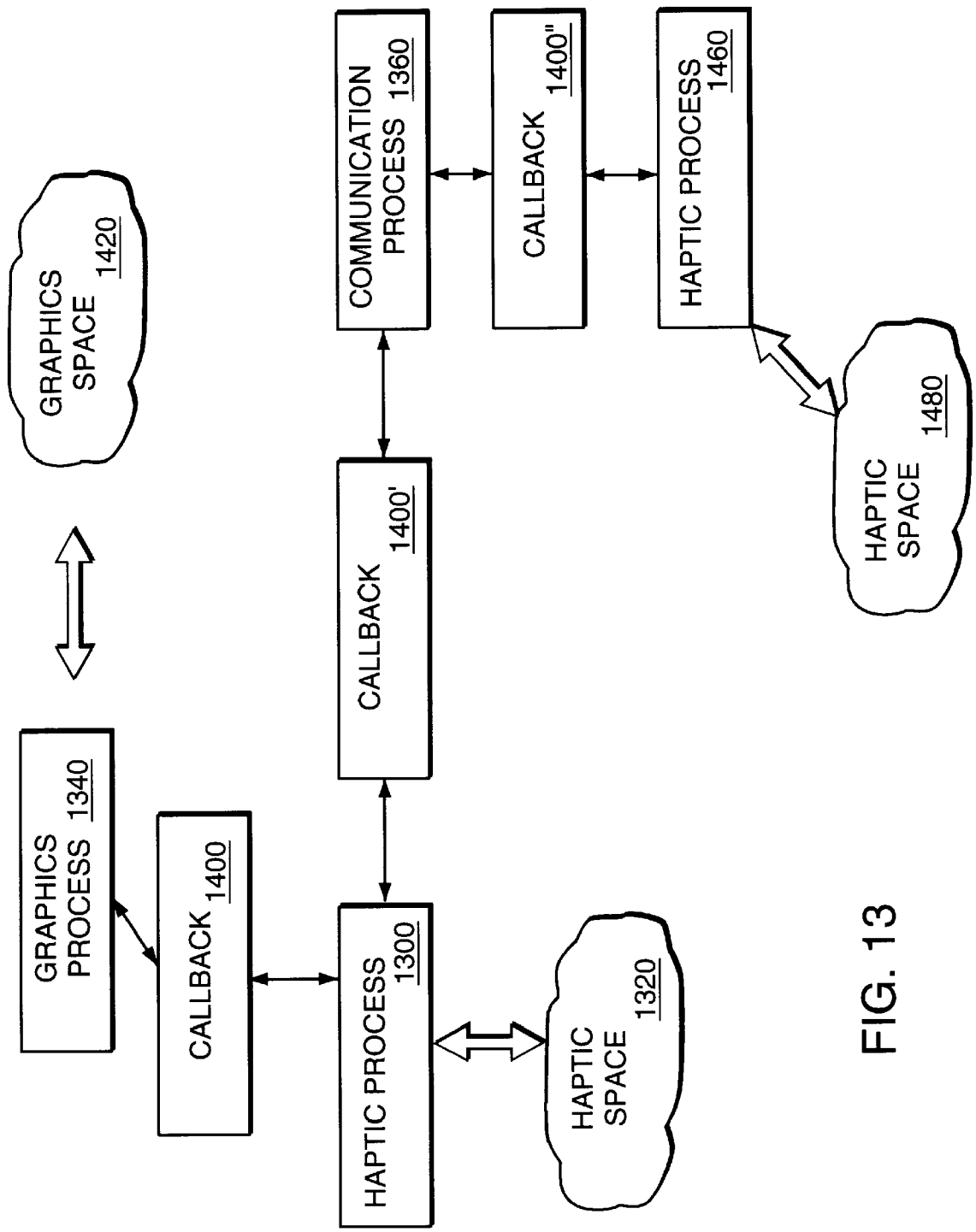
FIG. 13 is a block diagram of an embodiment of multiple processes communicating with a haptic process using callback mechanism.

One embodiment of a system using such synchronization is shown in FIG. 13. In this system, a haptic process 1300 manipulating and interacting with haptic space 1320 interacts with other processes such as a graphics process 1340 and a communications process 1360 using a "callback" mechanism 1400. A callback 140 is a data structure which is associated with a virtual object by a process 1300 which created it. The data structure contains the parameters necessary for an object in one space to be manipulated in a second space.

In the embodiment of the system as shown, each callback 1400, 1400', 1400" (generally 1400) is associated by the haptic process 1300 which created the callback 1400 with an object in haptic space 1320. For example, the data structure associated with the object in haptic space would include its X-, Y- and Z-coordinates in haptic space. A process, such as the graphics process 1340, wishing to communicate with the haptic space 1320 in order to update the graphics space 1420, also associates the callback 1400 with same object in graphics space 1420. Thus when the graphics process 1340 wishes to know the new location of the object for its depiction in graphics space 1420, the graphics process 1340 accesses the callback 1400 associated with the object and the haptic process 1300 supplies the data structure with the latest X-, Y- and Z-coordinate information regarding the object. The graphics process 1340 then accesses the callback 1400 to retrieve the coordinate information and after making the appropriate transformations displays the new object location in graphics space 1420.

Similarly a second haptic process 1460 manipulating and interacting with a second haptic space 1480 can interact with the first haptic process 1300 through a communications process 1360. In this case the communications process 1360 interacts with each haptic process 1300, 1460 through a callback 1400', 1400" respectively associated with each process. Thus when one haptic process 1300 needs information regarding the forces on an object generated by a user using another haptic process 1460, the communications process 1360 requests information from the second process 1460 through the callback 1400". The haptic process request information from a second process through the same callback with which the second process requests data from the haptic process.

Figure 14:
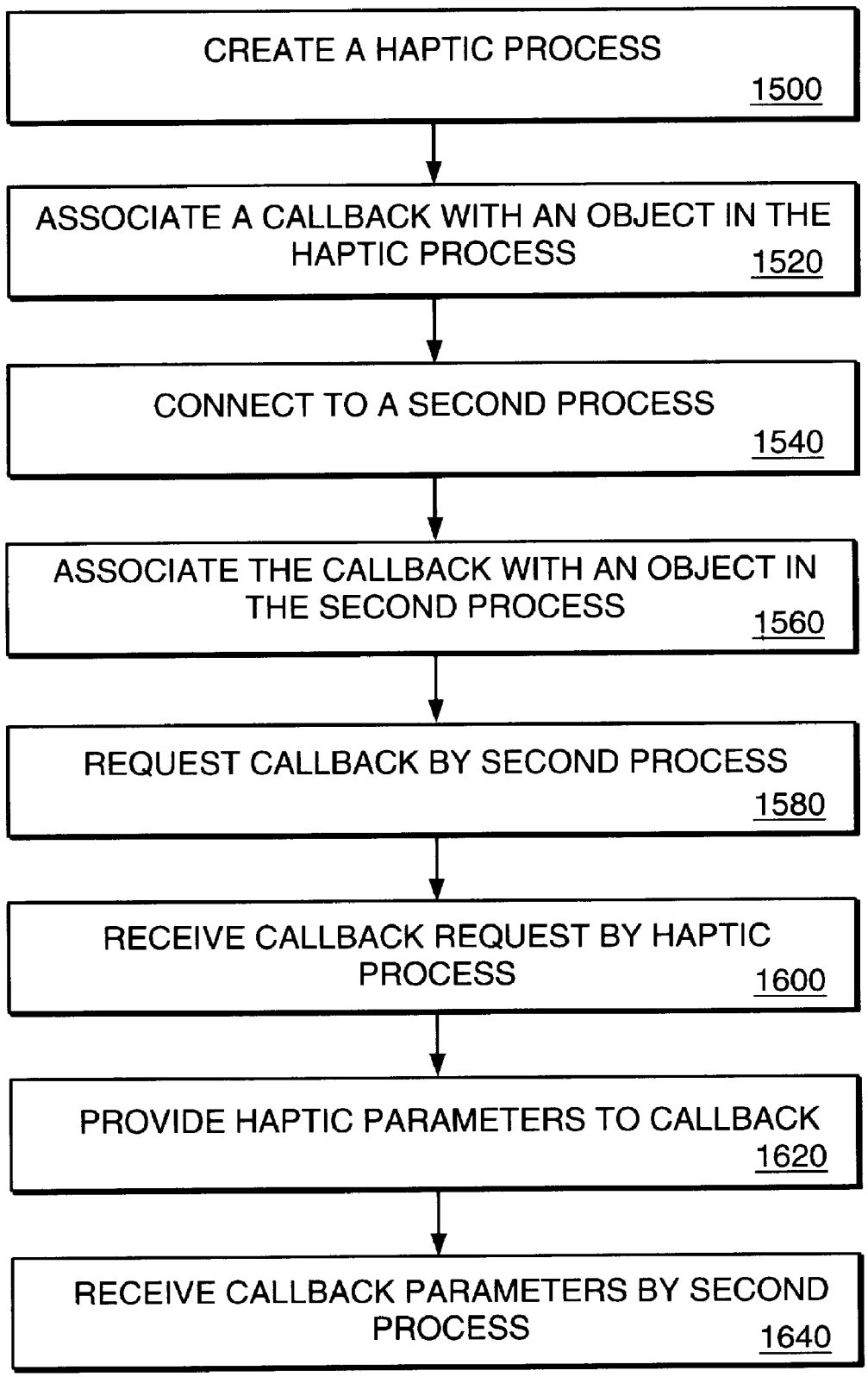
FIG. 14 is a flow diagram of a method of establishing and using a callback to communicate between a haptic process and another process.

The steps therefore involved in using a callback are shown in FIG. 14. A haptic process is first created (step 1500) which defines objects in the haptic space. The haptic process then creates a callback data structure and associates the data structure with an object in the haptic space (Step 1520). A connection is then made with a second process, such as a graphics process (Step 1540) and the callback is associated with an object in the space of the second process (Step 1560).

When the second process needs information about the object, the second process makes a request of the callback (Step 1580) and the haptic process is informed of the request (Step 1600). The haptic process then provides the haptic parameters associated with the object to the callback (Step 1620). The second process then accesses the parameters in the callback (Step 1640) and uses these parameters to manipulate the object in its space.

The capability of two haptic processes to communicate over a communications link permits a user on one network node to experience the tactile sensation from a process operating on a second network node. This permits haptic virtual reality environments to be shared across the network as easily as graphic virtual reality environments are presently shared.

Many typical virtual reality applications provide an image of an object on a display with which a user can interact. Each of these images, or virtual objects, are composed of many points. The complexity of the virtual object determines how many points are needed to define the object. Very complex objects require thousands of points in order for the object to seem real to the user. In order for the virtual objects to seem "real" to the user, all the points defining the surface of the object must be presented to the user at the same time. When the user interacts with the object, all of the points composing the object must be updated to display the result of the interaction to the user. For example, if a user moves a virtual cube from a first location to a second location, each point of the cube must be transformed to appear at the second location on the display.

In contrast, in one embodiment of the present invention, only one point of a haptic interactive representation is presented to a user at a time. A user is only able to "touch" and interact with one point of the haptic interactive representation at a time. In one embodiment, to determine the reaction forces to be applied to the user, the haptic rendering application transforms every point of each virtual object to determine the corresponding points in real space and then calculates the reaction forces to be applied to a user in real space. In another embodiment, the haptic rendering application transforms the position of the user in real space into each virtual objects' space in the haptic interaction space. As used herein, an "object's space" refers to the coordinate system defining a particular object. Each object has its own coordinate system which defines and travels with that object. The advantage of this method is that the haptic rendering application only has to transform a single point from real space into each of the object spaces rather than transforming each of the points defining each of the objects in the object spaces into real space. In the majority of cases, utilizing this method significantly decreases the amount of computations necessary to calculate the appropriate reaction forces to be applied to the user in real space. This method cannot be used by graphics applications because graphics applications present many points to a user at a time.

Figure 15:
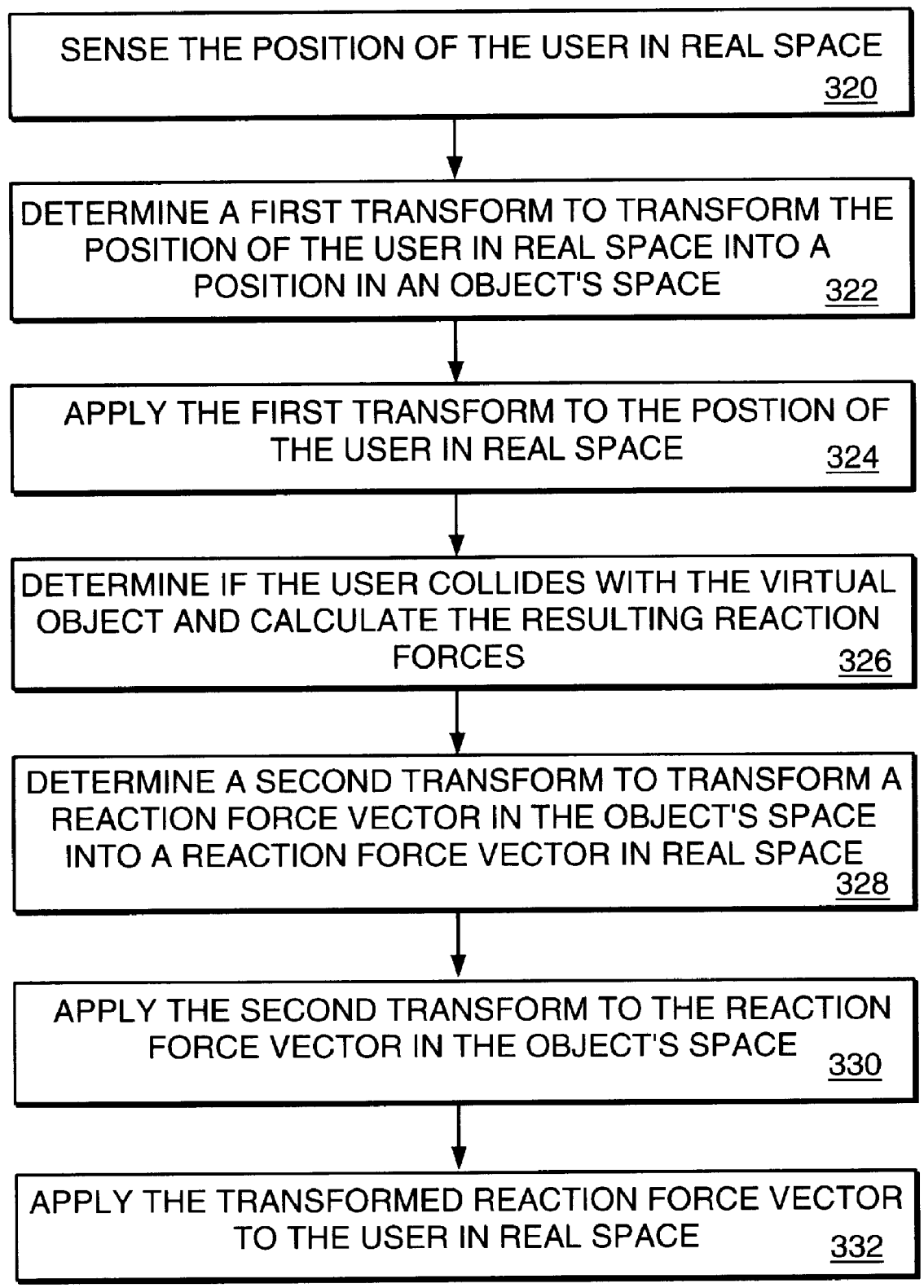
FIG. 15 is a flowchart representation of another embodiment of a process for determining the reaction forces to be applied to a user in real space through a haptic interface device.

FIG. 15 shows a flowchart illustrating the steps performed by this embodiment to determine the reaction forces to be applied to the user in real space through a haptic interface device. In step 320, the haptic interface device senses the position of the user in real space. The user's position in real space is represented by a set of real world coordinates. Next, in step 322, the haptic rendering application determines a first transform to transform the position of the user in real space into a position in an object's space. In one embodiment, the first transform is a transformation matrix which transforms the user's real space coordinates into coordinates in the object's space. The haptic rendering application determines a transform for each object in the haptic interaction space. In step 324 the haptic rendering application applies the transform to the user's real space coordinates to obtain the user's coordinates in the object's space. In step 326, the haptic rendering application determines if the user's coordinates in the object's space collide with the virtual object. Also in step 326 the haptic rendering application calculates the resulting reaction forces to be applied to the user. The resulting reaction forces are represented by vectors. In step 328, the haptic rendering application determines a second transform to transform the reaction force vectors calculated in step 326 from the object's space into a vector in real space. In one embodiment, the second transform is a transformation matrix which transforms the vector in object space coordinates in to a vector in real space coordinates. The haptic rendering application determines a transform for each object in the haptic interaction space. In step 330, the haptic rendering application applies the second transform to the reaction force vector in the object's space that was calculated in step 326. Finally in step 332, the transformed reaction force vector is applied to the user in real space.

In another embodiment, the haptic rendering application transforms a set of points representing the user' position in real space into each object's space.

Figure 16:
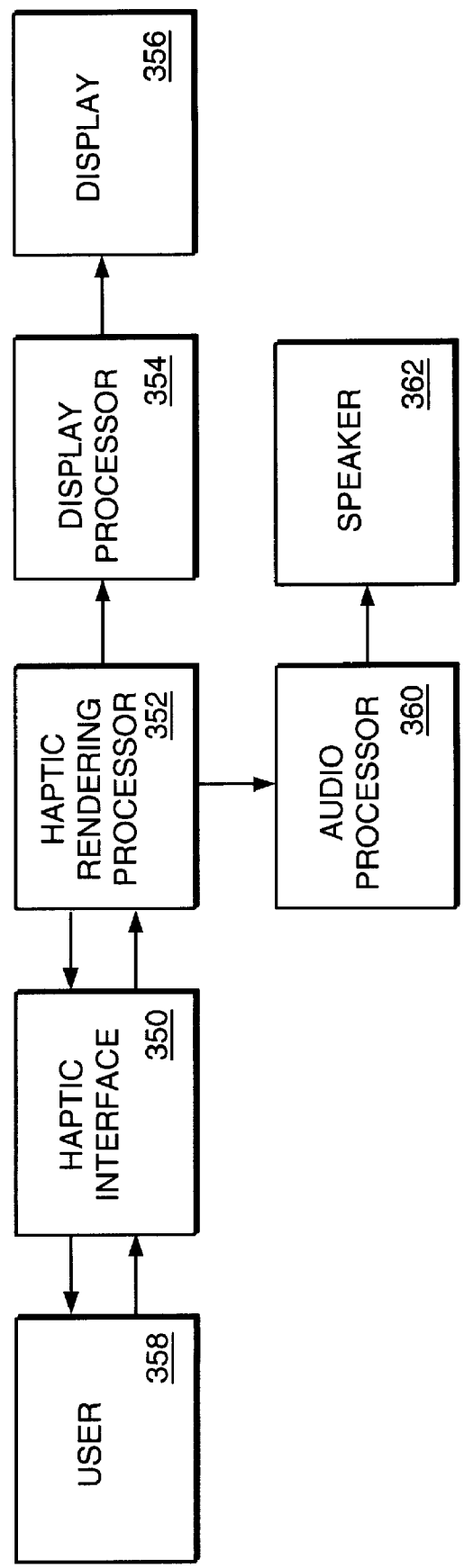
FIG. 16 is a flow diagram of one embodiment of the invention.

The present invention also relates to an apparatus for generating and interfacing with a haptic virtual reality environment. FIG. 16 shows an embodiment of an apparatus for enabling a user to generate and interface with a haptic virtual reality environment. The apparatus includes a haptic interface device 350, a haptic rendering processor 352, a display processor 354 and a display 356. The haptic interface device 350 includes a sensor for sensing the position of the user 358 in real space and a force actuator for applying forces to the user in real space.

The haptic rendering processor 352 is in electrical communication with the haptic interface device 350. The haptic rendering processor 352 executes an algorithm to generate a haptic interactive representation and determine the forces to be applied to the user 358 in real space. In one embodiment, the algorithm includes a module generating a haptic interactive representation, a module determining the user's haptic interface location in haptic interaction space, and a module calculating a force to be applied to the user in real space. The module determining the user's haptic interface in haptic interaction space translates the position of the user in real space into a position in haptic interaction space. The module calculating a force to be applied to the user determines whether the user's haptic interface location collides with any of the virtual objects. If the user's haptic interface location does not collide with any virtual objects, then this module calculates a force to be applied to the user in response to the user's haptic interface location. If the user's haptic interface location does collide with at least one virtual object then this module calculates a force to be applied to the user in response to proposed surface contact points for each virtual object. The haptic interface device 350 produces the force calculated by the haptic rendering processor 352 and applies the calculated force to the user 358.

The display processor 354 is in electrical communication with the haptic rendering processor 352. The display processor 354 displays the representation of the virtual object created by the haptic rendering processor on a display 356. The display 356 may be a computer screen, television screen, or any other device known in the art for displaying images of objects. In one embodiment, the apparatus also includes an audio processor 360 and a speaker 362. The audio processor 360 is in electrical communication with the haptic rendering processor 352. The audio processor produces audio sounds in response to the interactions of the virtual objects and the user in the virtual environment. The speaker 362 is in electrical communication with the audio processor 360. The speaker 362 outputs the sounds produced by the audio processor.

In one embodiment, the haptic rendering processor 352, the display processor 354 and the audio processor 360 are different processors. In another embodiment, the haptic rendering processor 352, the display processor 354 and the audio processor 360 are the same processor. In yet another embodiment, the module generating a haptic interactive representation, the module determining the user's haptic interface location in haptic interaction space, and the module calculating a force to be applied to the user in real space are separate devices.

In one embodiment, the apparatus shown in FIG. 16 for generating and interfacing with a haptic virtual reality environment is a real-time, object-oriented, virtual environment creation tool which allows the user 358 to create, modify, save and restore three-dimensional multi-modal virtual environments using visual and haptic interaction techniques. The resulting virtual environment can be felt, seen and heard by the user 358.

Figure 17:
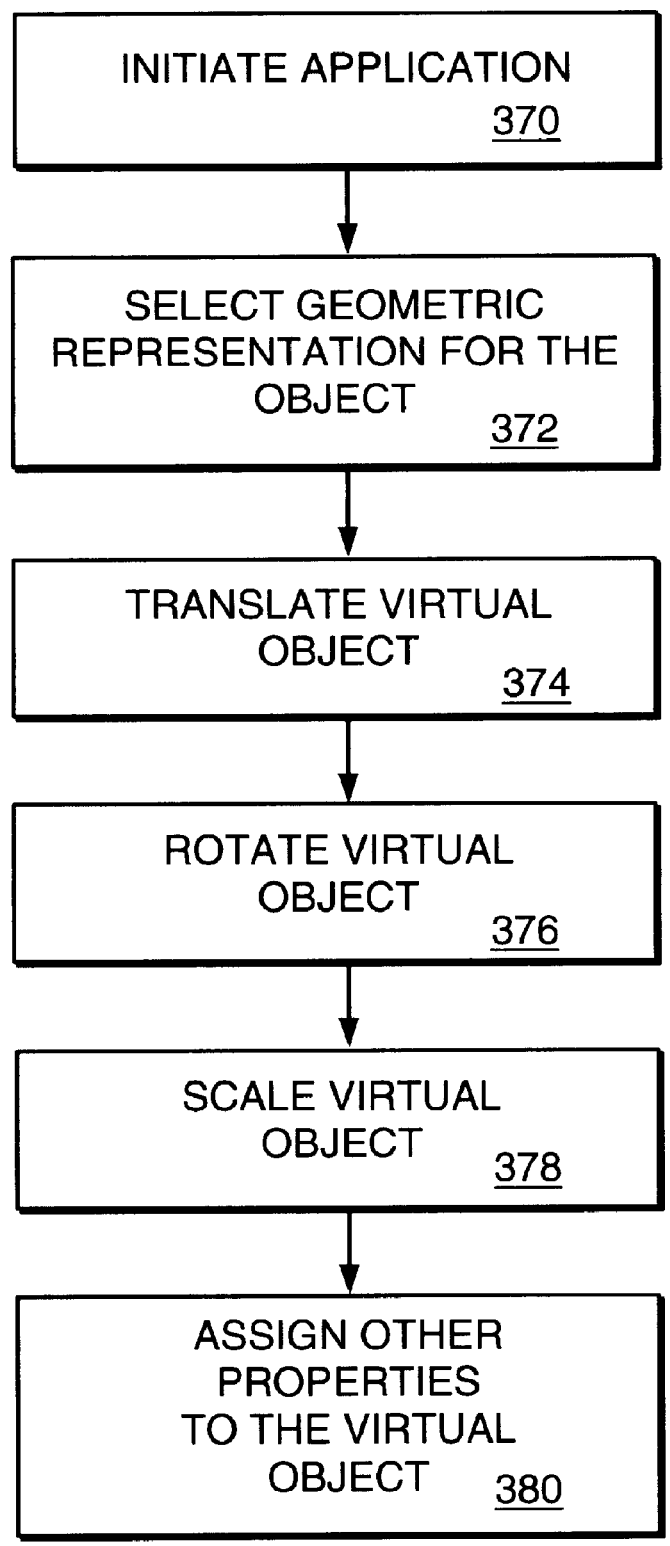
FIG. 17 is a flowchart representation of an embodiment of a process for generating a virtual reality environment.

FIG. 17 shows a flowchart illustrating the steps a user would perform to create and interface with a virtual environment using an embodiment of the apparatus described above and shown in FIG. 16. In step 370, the user initiates the toolkit application. In one embodiment the display processor 354 displays a graphical user interface on the display 356. In one embodiment, the graphical user interface contains icons which performs functions when selected by the user 358. The icons may consist of geometric representations the user can select to build virtual objects in the virtual environment. The icons may represent functions for operating on the geometric representations. The icons may also include different parameters that may be associated with a geometric representation. These parameters may include textures, mass, velocity, acceleration, angular velocity, angular acceleration, inertia, friction, viscosity, compliance and other behavior parameters which may be assigned to the surfaces of virtual objects. In another embodiment, the graphical display contains pull-down menus from which the user may select functions to be performed by the application.

To create the haptic interactive representation, in step 372 the user selects a base geometric representation for the virtual object that the user desires to create. To select the object, the user manipulates the haptic interface device 350 until the display 356 displays an image of the user's haptic interface location over the icon representing the geometric representation. The user then elects the geometric representation by "pressing" the icon. When the user presses the icon, the user experiences a force fed back through the haptic interface device 350 which simulates the feel of pressing a button. Selecting the geometric representation icon sends a signal to the haptic rendering processor 352 to create a virtual object. The haptic rendering processor 352 then places a virtual object in the shape of the selected geometric representation into the haptic interactive representation. The user may now haptically interact with the virtual object through the haptic interface device 350. The display processor 354 also places an image of the virtual object on the display 356. If the user desires, in step 374 the user may translate the virtual object anywhere within the haptic interaction space. To translate the object, the user selects the translate command and uses the haptic interface device 350 to come into contact with the object. Once the user is in contact with the object, the user may "pick up" the object and place the object in the desired location. Similarly, in step 376, the user may rotate the virtual object. In step 578, the user may scale the virtual object to the desired shape and size by selecting the scale command and contacting a point on the surface of the virtual object. Once the user has contacted a point, the user may "grab" that point and stretch the virtual object to the desired size and shape. In step 380, the user may assign any other desired properties to the object. These properties may include mass, velocity, acceleration, texture, or any of the other surface and dynamic properties described above. The user may then repeat this process to place another virtual object in the haptic interactive representation.

In another embodiment, the user may manipulate the visual appearance of the virtual objects on the display 356. In yet another embodiment, the user may assign audio sounds to the interactions in the virtual environment.

In one embodiment, the user may save the haptic interactive representation and recall it later. Upon recall, the user may interact with the virtual objects in the haptic interactive representation.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for delivering force feedback to a user according to an interaction in a haptic interaction space, the method comprising:
    defining said haptic interaction space;
    defining a graphics space;
    rendering a plurality of virtual objects in said haptic interaction space, wherein said plurality of virtual objects comprises at least two members selected from the group consisting of a primitive object, a polygonal object, an algebraic object, a constructed solid geometry object, an algebraic surface representation, and a volumetric object representation;
    delivering force feedback to said user at a first rate through a haptic interface device according to said interaction in said haptic interaction space; and
    depicting said interaction in said graphics space by refreshing a graphics display at a second rate less than said first rate.

2. The method of claim 1, wherein at least one of said plurality of virtual objects is a voxel representation.

3. The method of claim 1, wherein the rendering step comprises storing said plurality of virtual objects.

4. The method of claim 1, wherein the rendering step comprises displaying said plurality of virtual objects.

\* \* \* \* \*